US012710829B2

(12) United States Patent
Cheung et al.

(10) Patent No.: US 12,710,829 B2
(45) Date of Patent: Aug. 18, 2026

(54) INPUT SYSTEM FOR PORTABLE ELECTRONIC DEVICE

(71) Applicant: Apple Inc., Cupertino, CA (US)

(72) Inventors: Matthew J. Cheung, Castro Valley, CA (US); Morgan M. Wagner, San Francisco, CA (US); Melissa Fung, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/740,493

(22) Filed: Jun. 11, 2024

(65) Prior Publication Data

US 2025/0377734 A1 Dec. 11, 2025

(51) Int. Cl.

| | |
|---|---|
| ***G06F 3/02*** | (2006.01) |
| ***G06F 1/16*** | (2006.01) |
| ***G06F 3/01*** | (2006.01) |
| ***H04N 23/63*** | (2023.01) |
| ***H04N 23/69*** | (2023.01) |
| *G06F 3/041* | (2006.01) |

(52) U.S. Cl.

CPC .............. *G06F 3/02* (2013.01); *G06F 1/1626* (2013.01); *G06F 3/016* (2013.01); *H04N 23/631* (2023.01); *H04N 23/69* (2023.01); *G06F 3/041* (2013.01)

(58) Field of Classification Search

CPC ........ H04N 23/13; H04N 23/51; H04N 23/66; H04N 23/80; H04N 23/661; H04N 23/698; H04N 23/90; G06T 3/4038; G06T 1/20; G06T 2200/32; G06T 2207/20221

See application file for complete search history.

(56) References Cited

U.S. PATENT DOCUMENTS

| | | | |
|---|---|---|---|
| 2,866,141 | A | 12/1958 | Frank et al. |
| 4,037,068 | A | 7/1977 | Gaynor |
| 4,258,096 | A | 3/1981 | LaMarche |
| 4,324,956 | A | 4/1982 | Sakakino et al. |
| 4,345,119 | A | 8/1982 | Latasiewicz |
| 4,581,509 | A | 4/1986 | Sanford et al. |
| 4,922,070 | A | 5/1990 | Dorkinski |
| 5,258,592 | A | 11/1993 | Nishikawa et al. |

(Continued)

FOREIGN PATENT DOCUMENTS

| | | |
|---|---|---|
| CN | 108770285 | 11/2018 |
| EP | 2720129 | 4/2014 |

(Continued)

*Primary Examiner* — Hung H Lam
(74) *Attorney, Agent, or Firm* — Brownstein Hyatt Farber Schreck, LLP

(57) ABSTRACT

An electronic device may include an input button system including an input member positioned along the side exterior surface of a housing component and configured to receive a force input, a beam structure at least partially within the enclosure, the beam structure configured to be deflected as a result of the force input on the input member, a first strain sensing element at a first location of the beam structure, and a second strain sensing element at a second location of the beam structure. The electronic device may further include a processing system configured to determine a region on the input member where the force input was applied using the strain sensing elements, and cause the electronic device to perform a first operation in response to detecting that the force input satisfies a first force threshold.

20 Claims, 14 Drawing Sheets

(56) References Cited

U.S. PATENT DOCUMENTS

| | | | |
|---|---|---|---|
| 5,584,380 A | 12/1996 | Naitou | |
| 5,657,012 A | 8/1997 | Tait | |
| 6,344,791 B1 | 2/2002 | Armstrong | |
| 6,355,891 B1 | 3/2002 | Ikunami | |
| 6,525,278 B2 | 2/2003 | Villain et al. | |
| 6,963,039 B1 | 11/2005 | Weng et al. | |
| 7,119,289 B2 | 10/2006 | Lacroix | |
| 7,388,167 B2 | 6/2008 | Liao et al. | |
| 7,903,090 B2 * | 3/2011 | Soss | G06F 3/04142 345/184 |
| 8,167,126 B2 | 5/2012 | Stiehl | |
| 8,248,815 B2 | 8/2012 | Yang et al. | |
| 8,263,886 B2 | 9/2012 | Lin et al. | |
| 8,263,889 B2 | 9/2012 | Takahashi et al. | |
| 8,432,368 B2 | 4/2013 | Momeyer et al. | |
| 8,446,713 B2 | 5/2013 | Lai | |
| 8,576,044 B2 | 11/2013 | Chapman | |
| 8,648,829 B2 | 2/2014 | Shahoian et al. | |
| 8,885,856 B2 | 11/2014 | Sacha | |
| 9,058,941 B2 | 6/2015 | Malek et al. | |
| 9,064,654 B2 | 6/2015 | Whitt et al. | |
| 9,089,049 B2 | 7/2015 | Perrault et al. | |
| 9,118,883 B2 * | 8/2015 | Wan | H04N 5/772 |
| 9,263,204 B2 | 2/2016 | Rivera | |
| 9,449,770 B2 | 9/2016 | Sanford et al. | |
| 9,510,468 B2 | 11/2016 | Schack et al. | |
| 9,627,163 B2 | 4/2017 | Ely et al. | |
| 9,871,330 B2 | 1/2018 | Seo et al. | |
| 9,916,942 B2 | 3/2018 | Shedletsky | |
| 9,949,395 B2 | 4/2018 | Jung et al. | |
| 9,952,719 B2 * | 4/2018 | Li | G06F 3/0445 |
| 10,002,731 B2 | 6/2018 | Wang et al. | |
| 10,018,966 B2 | 7/2018 | Ely et al. | |
| 10,275,087 B1 * | 4/2019 | Smith | G06F 3/04817 |
| 10,775,889 B1 | 9/2020 | Lehmann et al. | |
| 10,831,299 B1 | 11/2020 | Lukens et al. | |
| 11,025,761 B1 | 6/2021 | Shim et al. | |
| 12,432,292 B2 | 9/2025 | Barton et al. | |
| 2004/0082414 A1 | 4/2004 | Knox | |
| 2007/0152959 A1 | 7/2007 | Peters | |
| 2008/0049980 A1 | 2/2008 | Castaneda et al. | |
| 2009/0312051 A1 | 12/2009 | Hansson et al. | |
| 2012/0067711 A1 | 3/2012 | Yang | |
| 2013/0037396 A1 | 2/2013 | Yu | |
| 2013/0087443 A1 | 4/2013 | Kikuchi | |
| 2015/0109170 A1 | 4/2015 | Kang et al. | |
| 2015/0199011 A1 | 7/2015 | Fukumoto et al. | |
| 2015/0221460 A1 | 8/2015 | Teplitxky et al. | |
| 2017/0069443 A1 | 3/2017 | Wang et al. | |
| 2017/0069444 A1 | 3/2017 | Wang et al. | |
| 2017/0351349 A1 | 12/2017 | Fassett | |
| 2018/0005496 A1 | 1/2018 | Dogiamis | |
| 2018/0081400 A1 | 3/2018 | Pandya et al. | |
| 2018/0307361 A1 | 10/2018 | Park | |
| 2020/0116435 A1 | 4/2020 | Lee et al. | |
| 2020/0396871 A1 | 12/2020 | Yun et al. | |
| 2021/0132728 A1 | 5/2021 | Hwang et al. | |
| 2023/0030748 A1 | 2/2023 | Pope et al. | |
| 2023/0289017 A1 * | 9/2023 | Tang | H03K 17/9622 |
| 2023/0377430 A1 * | 11/2023 | Ostdiek | G08B 6/00 |
| 2024/0256013 A1 | 8/2024 | Ganti et al. | |
| 2024/0319677 A1 * | 9/2024 | Davis | G04G 17/08 |
| 2025/0240363 A1 * | 7/2025 | Baker | H04M 1/0268 |

FOREIGN PATENT DOCUMENTS

| | | |
|---|---|---|
| JP | 3034908 | 3/1997 |
| KR | 20080045397 | 5/2008 |

* cited by examiner

INPUT SYSTEM FOR PORTABLE ELECTRONIC DEVICE

FIELD

The subject matter of this disclosure relates generally to portable electronic devices, and more particularly, to input systems for portable electronic devices.

BACKGROUND

Modern consumer electronic devices take many shapes and forms, and have numerous uses and functions. For example, a mobile phone or tablet computer may include a touch-sensitive display for providing graphical outputs and for accepting touch inputs, wireless communications systems for connecting with other devices to send and receive data and voice content, cameras for capturing photographs and videos, and so forth. Input systems may provide user control of certain device functions and settings.

SUMMARY

An electronic device may include an enclosure including a front cover defining a front exterior surface of the electronic device and a housing component coupled to the front cover and defining a side exterior surface of the electronic device. The electronic device may further include an input button system including an input member positioned along the side exterior surface of the housing component and configured to receive a force input, a beam structure at least partially within the enclosure, the beam structure configured to be deflected as a result of the force input on the input member, a first strain sensing element at a first location of the beam structure, and a second strain sensing element at a second location of the beam structure. The electronic device may further include a processing system coupled to the first strain sensing element and the second strain sensing element and configured to determine a location of the force input on the input member based at least in part on at least one of a first signal from the first strain sensing element or a second signal from the second strain sensing element, and cause the electronic device to perform a first operation in response to detecting, based at least in part on at least one of the first signal from the first strain sensing element or the second signal from the second strain sensing element, that the force input satisfies a first force threshold. The electronic device may further include a dome switch configured to collapse in response to the force input satisfying a second force threshold greater than the first force threshold, the electronic device configured to perform a second operation in response to detecting the collapse of the dome switch.

The first force threshold may be between about 0.8 Newtons and about 1.2 Newtons, and the second force threshold may be between about 3.0 Newtons and about 4.0 Newtons. The dome switch may be coupled to the beam structure, and force from the force input may be transferred to the beam structure via the dome switch.

The electronic device may further include a haptic actuation system, the processing system may be configured to cause the haptic actuation system to produce a first tactile output in response to detecting that the force input satisfies the first force threshold, and the dome switch may produce a second tactile output when collapsed in response to the force input satisfying the second force threshold. The dome switch may be positioned below the beam structure, and the dome switch may be partially deformed by the beam structure in response to the force input.

The electronic device may further include a camera, and a display configured to display graphical user interfaces. The first operation may include causing the display to transition to a graphical user interface associated with an image capture function, and the second operation may include capturing an image when the display is not displaying the graphical user interface associated with the image capture function. The processing system may be configured to, in accordance with a determination that the force input was applied to a first region of the input member, cause the electronic device to perform a third operation, and in accordance with a determination that the force input was applied to a second region of the input member, cause the electronic device to perform a fourth operation. The third operation may include a zoom-in operation, and the fourth operation may include a zoom-out operation.

A portable electronic device may include a touchscreen display, a battery, and an enclosure enclosing the touchscreen display and the battery, the enclosure including a front cover positioned over the touchscreen display and defining a front exterior surface of the enclosure, and a housing component coupled to the front cover and defining an opening along a side exterior surface of the enclosure. The portable electronic device may further include an input button system including a beam structure at least partially within the enclosure and including a first compliant segment positioned proximate a first end of the beam structure, and a second compliant segment positioned proximate a second end of the beam structure. The input button system may further include a first strain sensing element coupled to the first compliant segment, a second strain sensing element coupled to the second compliant segment, a switch element positioned proximate a central region of the beam structure, the central region of the beam structure between the first end and the second end of the beam structure, and an input member positioned at least partially in the opening and configured to impart a force on the beam structure and on the switch element as a result of a force input applied to the input member. The portable electronic device may further include a processing system configured to, in accordance with a determination that the force input satisfies a force threshold, cause the portable electronic device to perform an operation, the determination based at least in part on at least one of a first signal from the first strain sensing element or a second signal from the second strain sensing element, wherein the force threshold is less than an actuation force of the switch element.

The operation may include causing the touchscreen display to transition to a graphical user interface associated with an image capture function, and the portable electronic device may be further configured to capture an image in response to the switch element being actuated when the touchscreen display is not displaying the graphical user interface associated with the image capture function. The processing system may be further configured to determine a swipe direction of a swipe input applied to the input member based at least in part on a third signal from the first strain sensing element and a fourth signal from the second strain sensing element, the swipe input including a swipe gesture extending along a surface of the input member. The portable electronic device may be configured to perform a zoom-in operation in response to determining that the swipe direction is a first direction, and perform a zoom-out operation in response to determining that the swipe direction is a second direction opposite the first direction.

The processing system may be configured to determine a region on the input member where the force input was applied based at least in part on at least one of the first signal from the first strain sensing element or the second signal from the second strain sensing element.

The portable electronic device may further include a haptic actuation system, the processing system may be configured to cause the haptic actuation system to produce a first tactile output in response to detecting that the force input satisfies the force threshold, and the switch element produces a second tactile output when the switch element is actuated.

A difference between the force threshold and the actuation force may be between about 0.5 Newtons and about 1.5 Newtons.

An electronic device may include a housing component defining a side exterior surface, a front cover coupled to the housing component, a display positioned below the front cover, a haptic actuation system, an input member positioned along the side exterior surface of the housing component and configured to receive a force input, a beam structure at least partially within the electronic device, the beam structure configured to be deflected as a result of the force input on the input member, a first strain sensing element at a first location of the beam structure, a second strain sensing element at a second location of the beam structure, a processing system coupled to the first strain sensing element and the second strain sensing element and configured to, based at least in part on at least one of a first signal from the first strain sensing element or a second signal from the second strain sensing element, determine that the force input satisfies a first force threshold, and in response to determining that the force input satisfies the first force threshold, cause the haptic actuation system to produce a first tactile output, and a dome switch configured to collapse in response to the force input satisfying a second force threshold, thereby producing a second tactile output, the second force threshold greater than the first force threshold.

The input member may define a first input region at a first end of the input member, and a second input region at a second end of the input member opposite the first end, and the processing system may be further configured to determine whether the force input was applied to the first input region of the input member or the second input region of the input member based at least in part on the first signal from the first strain sensing element or the second signal from the second strain sensing element. The electronic device may further include a camera, the dome switch may be configured to collapse at the second and the processing system may be further configured to, in response to determining that the force input satisfies the first force threshold and was applied to the first input region of the input member, perform a zoom-in operation, in response to determining that the force input satisfies the first force threshold and was applied to the second input region of the input member, perform a zoom-out operation, and in response to the dome switch collapsing, capture an image with the camera.

The haptic actuation system may be configured to produce a third tactile output in response to a touch input applied to the front cover. The dome switch may be positioned on the beam structure and the force input may be imparted to the beam structure via the dome switch.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
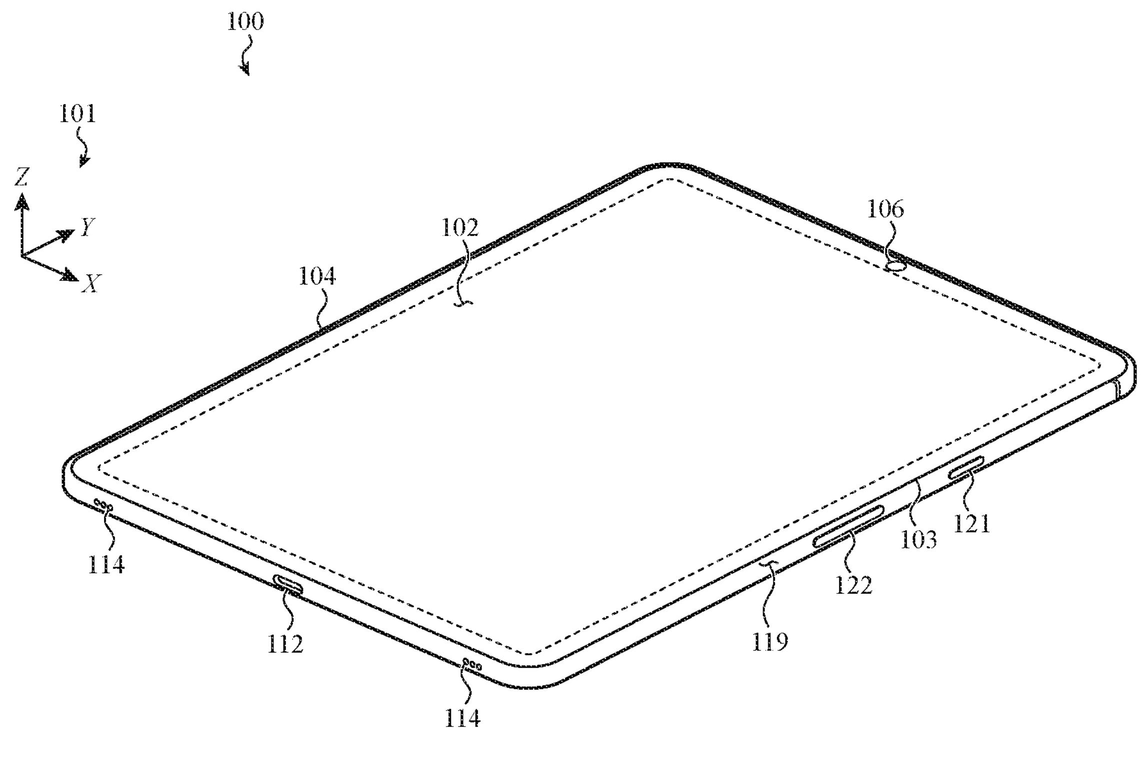
FIGS. 1A-1C depict an example electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Portable electronic devices as described herein may include complex, sophisticated components and systems that facilitate a multitude of functions. For example, portable electronic devices according to the instant disclosure may include touch- and/or force-sensitive displays, numerous cameras (including both front- and rear-facing cameras), GPS systems, haptic actuators, wireless charging systems, and all requisite computing components and software to operate these (and other) systems and otherwise provide the functionality of the devices.

In many cases, portable electronic devices use input devices such as buttons, switches, and the like to accept user inputs to the device. In order to provide more ways for users to interact with or control a device, described herein are example input button systems that can detect and respond to multiple different styles of physical input. For example, as described herein, an input button system may be configured to detect binary or momentary inputs while also detecting a magnitude of the force being applied to the input system. This arrangement may allow a user to provide a greater range of operational information to the device via a single input system and without requiring the user to move their hands or interact with a separate or different input system. For example, a device using such input button systems may respond differently to different force inputs (e.g., at different force thresholds). Thus, for example, a less forceful press may cause the device to perform one operation, and more forceful press may cause the device to perform a different action.

Additionally, input button systems as described herein may be configured to determine a location of an input on the input member. More particularly, strain-sensing or other force-sensitive systems may be strategically positioned in the button mechanism to facilitate the detection of the magnitude of a force input (e.g., a press) as well as a location or region on the input member where the force input was applied. In some cases, such location-sensing capabilities are provided by systems and mechanisms that are inside the device housing (e.g., without integrating external touch-sensing elements such as capacitive sensing systems). This configuration may allow the device to provide multiple input sensing capabilities (e.g., responding to multiple force thresholds and detecting an input location) while still maintaining a high degree of environmental sealing and overall simplicity.

Input button systems as described herein may also operate in conjunction with various types of haptic output systems to provide various types of tactile outputs and/or responses in response to inputs. For example, input button systems may include a dome switch or other switch element. Such switches may provide both binary force sensing functionality, as well as a tactile output when the switch is actuated (e.g., when a dome switch collapses, the switch is actuated and the collapse produces a click that the user can feel). Additionally, since the input button systems can detect magnitudes and locations of input forces, the devices may use other onboard haptic actuators (e.g., linear resonant actuators, rotating eccentric mass actuators, etc.) to produce tactile outputs in response to a force input satisfying any suitable force or location criteria. Thus, while a dome switch may produce a tactile output at one force value (e.g., the actuation force for that dome switch), an electronic device may produce other tactile outputs in response to other force inputs as well. For example, the electronic device may cause an onboard haptic actuator to produce tactile outputs in response to a force input having a different force value than the actuation force of the dome switch (e.g., less than or greater than the actuation force), in response to a force at a certain location on the input member, or the like. In some cases, different tactile outputs (e.g., different patterns, amplitudes, frequencies, etc.) may be produced in response to different inputs, such as a first tactile output in response to an input at one location on an input member, and a second, different tactile output in response to an input at a different location on the input member.

Additionally, the combination of force sensing and haptic output functionality allows the input buttons described herein to have multiple stages of input. For example, the input buttons may allow a user to provide a "half" or "partial" click to the input button, as well as a "full" click (or optionally more stages). Different tactile outputs may accompany each stage of an input, and the device may respond differently to each stage (e.g., taking a different action or performing a different operation in response to each stage).

Figure 1B:
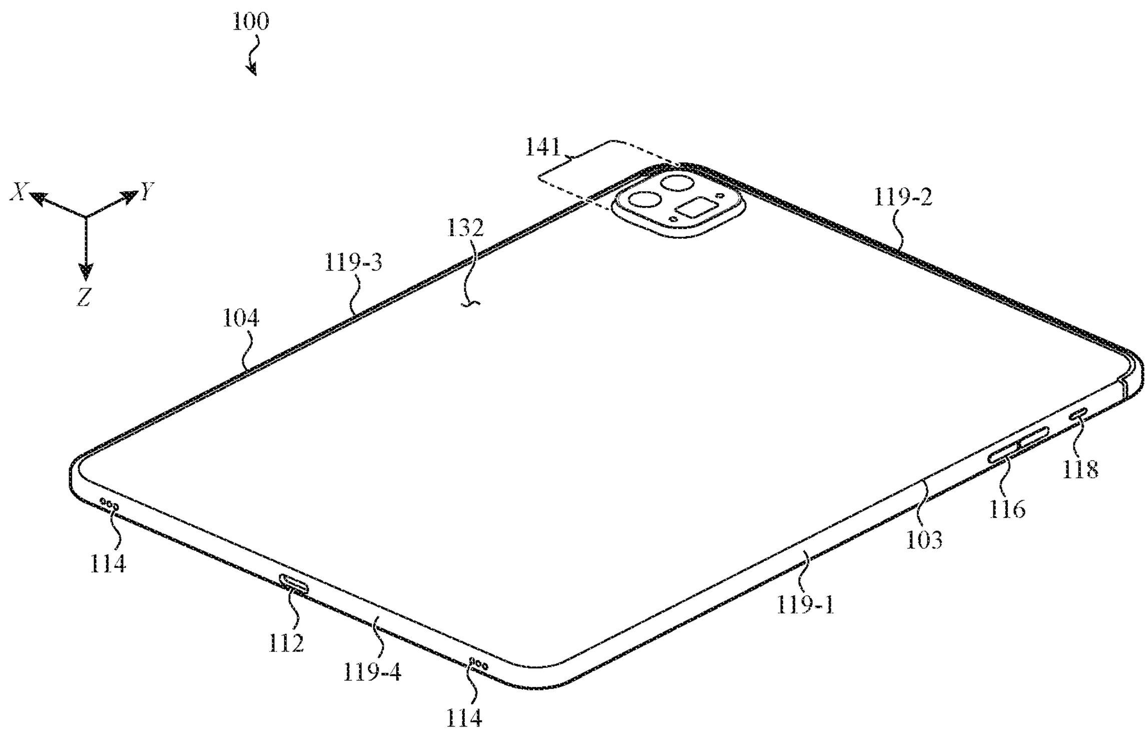

FIGS. 1A and 1B show an example electronic device 100. FIG. 1A illustrates a front of the device 100, while FIG. 1B illustrates a back side of the device. While the device 100 is depicted as a tablet computer, the concepts presented herein may apply to any appropriate electronic devices, including mobile phones, portable electronic devices, wearable devices (e.g., watches, head-mounted displays, headphones, earbuds, etc.), laptop computers, tablet computers, handheld gaming devices, computing peripherals (e.g., mice, touchpads, keyboards), or any other device. Accordingly, any reference to an "electronic device" encompasses any and all of the foregoing.

The electronic device 100 includes a cover 102 (e.g., a front cover) attached to a housing 104 (which may include a housing structure defined by one or more housing components). The cover 102 may be positioned over a display 103. The cover 102 may be a sheet or sheet-like structure formed from or including a transparent or optically transmissive material. In some cases, the cover 102 is formed from or includes a glass material and may therefore be referred to as a glass cover member. The glass material may be a silica-based glass material, an aluminosilicate glass, a boroaluminosilicate glass, an alkali metal aluminosilicate glass (e.g., a lithium aluminosilicate glass), or a chemically strengthened glass. Other example materials for the cover 102 include, without limitation, sapphire, ceramic, glass-ceramic, crystallizable glass materials, or plastic (e.g., polycarbonate). A glass-ceramic material may be a silica-based glass ceramic material, such as an aluminosilicate glass ceramic material or a boroaluminosilicate glass ceramic material. The glass-ceramic material may be chemically strengthened by ion exchange. The cover 102 may be formed as a monolithic or unitary sheet. The cover 102 may also be formed as a composite of multiple layers of different materials, coatings, and other elements.

The display 103 may be at least partially positioned within the interior volume of the housing 104. The display 103 may be coupled to the cover 102, such as via an adhesive or other coupling scheme. The display 103 may include a liquid-crystal display (LCD), a light-emitting diode (LED) display, an organic light-emitting diode (OLED) display, an active layer organic light-emitting diode (AMOLED) display, an organic electroluminescent (EL) display, an electrophoretic ink display, or the like. The display 103 may be configured to display graphical outputs, such as graphical user interfaces, that the user may view and interact with. Graphical outputs may be displayed in a graphically active region of the display 103 (e.g., an active display region). The display 103 may also define a primary display region, which may generally correspond to the main front-facing, contiguous display region, in which graphical user interfaces, images, videos, applications, and other graphical outputs may be displayed.

The display 103 may include or be associated with one or more touch- and/or force-sensing systems. In some cases, components of the touch- and/or force-sensing systems are integrated with the display stack. For example, touch-sensing components such as electrode layers of a touch and/or force sensor may be provided in a stack that includes display components (and is optionally attached to or at least viewable through the cover 102). The touch- and/or force-sensing systems may use any suitable type of sensing technology and touch-sensing components, including capacitive sensors, resistive sensors, surface acoustic wave sensors, piezoelectric sensors, strain gauges, or the like. The front exterior surface of the cover 102 may define an input surface (e.g., a touch- and/or force-sensitive input surface) of the device. While both touch- and force-sensing systems may be included, in some cases the device 100 includes a touch-sensing system and does not include a force-sensing system. A display that includes touch-sensing functionality may be referred to as a touchscreen or a touchscreen display.

The device 100 may also include a front-facing camera 106. The front-facing camera 106 may be positioned below or otherwise covered and/or protected by the cover 102. The front-facing camera 106 may have any suitable operational parameters. For example, the front-facing camera 106 may include a 12-megapixel sensor (with 1 micron pixel size), and an 80-90° field of view. The front-facing camera 106 may have an aperture number of f/1.9. The front-facing camera 106 may include auto-focus functionality (e.g., one or more lens elements may move relative to an optical sensor to focus an image on the sensor). Other types of cameras may also be used for the front-facing camera 106, such as a fixed-focus camera.

The device 100 may also include one or more buttons (such as buttons 116, 121, 122), switches (such as switch 118), and/or other physical input systems. Such input systems may be used to control power and/or sleep/wake states (e.g., the button 121), change speaker volume (e.g., the button 116), switch between "ring" and "silent" modes (e.g., the switch 118), activate camera or image capture functions (e.g., the button 122), and the like. In some cases, the functionality of one or more buttons may be user-selectable, such that the user can select the action(s) that the device performs in response to a button actuation. Also, the particular function of one or more of the buttons may depend at least in part on a mode or state of the device. For example, pressing a button may have a different effect when the device is displaying a primary graphical user interface (e.g., a home screen) than when the device is displaying an application graphical user interface (e.g., an image capture user interface).

As described herein, one or more buttons (e.g., the buttons 116, 121, 122) may include both switch elements (e.g., dome switches or tactile switches), as well as strain-sensing systems that detect inputs to the buttons based on a detected strain (which corresponds to a force). Such buttons may also be associated with haptic actuation systems that produce a tactile or haptic output in response to a detection of a strain (e.g., force) that satisfies a condition. Thus, for example, upon detecting a strain that satisfies a condition (and/or an electrical parameter that is indicative of a strain satisfying the condition), a haptic actuation system may impart a force on a button (or to the device more generally) to produce a tactile output (e.g., resembling a "click"). This tactile or haptic output may provide tactile feedback to the user to indicate that the input has been recognized by the device. Also, as described herein, the switch elements may be used to detect inputs that exceed a particular force, and to provide a tactile output in response to that force. Tactile or haptic outputs may be produced by imparting a force directly to the button or a component of the button, or by imparting a force to the device as a whole (e.g., a global haptic), which may be perceived by a user via the button or via the device enclosure more generally.

The switch 118 may be a toggle or bistable switch that is positionable in a first position and a second position. Changing the position of the switch 118 (e.g., between first and second positions) may cause the device to change its mode or operating state. For example, positioning the switch 118 in the first position may cause the device to operate in a "ring" mode (in which an audio output is produced in response to a notification such as an incoming call or message), and positioning the switch 118 in the second position may cause the device to operate in a "silent" mode (in which audio output is not produced in response to a notification such as an incoming call or message). The device 100 may also include a charging port 112 (e.g., for receiving a connector of a power cable for providing power to the device 100 and charging the battery of the device 100). The charging port 112 may receive a connector of any suitable design. In some cases, the charging port 112 receives a connector corresponding to a USB connector type, such as a USB-C connector. The charging port 112 may also be configured to send and/or receive data via a cable, such as with a USB or other communication protocol.

The device 100 may also include audio openings 114. The audio openings 114 may allow sound output from an internal speaker system to exit the housing 104. The device 100 may also include one or more microphones. In some cases, a microphone within the housing 104 may be acoustically coupled to the surrounding environment through an audio opening 114.

FIG. 1A also includes an example coordinate system 101 that may define directions with reference to the device 100 (or other electronic devices described herein). The coordinate system 101 defines a positive x direction, a positive y direction, and a positive z direction. Unless stated otherwise, references herein to a positive x, positive y, or positive z direction will be understood to refer generally to the coordinate system 101 and its relationship to the device 100 in FIG. 1A. Negative x, y, and z directions will be understood to be opposite to the positive x, y, and z directions shown in the coordinate system in FIG. 1A.

FIG. 1B illustrates a back side of the device 100. The housing 104 may include or may define a rear exterior surface 132, and may include or define one or more side exterior surfaces 119. The cover 102 (e.g., the front cover, shown in FIG. 1A) and the housing 104 may at least partially define an enclosure of the device 100 (e.g., the enclosure may enclose components of the device). The enclosure may define an internal volume in which components of the device 100 are positioned. The rear surface 132 may be integral with the sides of the housing 104 (e.g., the back and at least some of the sides may be part of a single piece of material), or it may be defined by a separate member (e.g., a rear cover, which may be formed from glass, metal, polymer, composite, or any other suitable material). Where the rear surface 132 is defined by a separate member, the device 100 may include a band-shaped housing member that defines the sides of the enclosure, a front cover that defines the front surface, and a rear cover that defines the rear surface.

The device 100 may also include a sensor array 141 (e.g., a rear-facing sensor array in a rear-facing sensor array region) that includes one or more cameras (e.g., two cameras, as shown). The sensor array 141 may be in a sensor array region that is defined by a protrusion along the rear of the device 100. The protrusion may define a portion of the rear exterior surface of the device 100, and may at least partially define a raised sensor array region of the sensor array 141.

The sensor array 141, along with associated processing systems (e.g., the processing units 801, FIG. 8) and software, may provide several image-capture features, including the ability to capture still images, video images, bursts of multiple static images, etc.

In some cases, the sensor array 141 may be configured to capture full-resolution video clips of a certain duration each time a user captures a still image. As used herein, capturing full-resolution images (e.g., video images or still images) may refer to capturing images using all or substantially all of the pixels of an image sensor, or otherwise capturing images using the maximum resolution of the camera (regardless of whether the maximum resolution is limited by the hardware or software).

The captured video clips may be associated with the still image. In some cases, users may be able to select individual frames from the video clip as the representative still image associated with the video clip. In this way, when the user takes a snapshot of a scene, the camera will actually record a short video clip (e.g., 1 second, 2 seconds, or the like), and the user can select the exact frame from the video to use as the captured still image (in addition to simply viewing the video clip as a video).

The cameras of the sensor array 141 may also have or provide a high-dynamic-range (HDR) mode, in which the camera captures images having a dynamic range of luminosity that is greater than what is captured when the camera is not in the HDR mode. In some cases, the sensor array 141 automatically determines whether to capture images in an HDR or non-HDR mode. Such determination may be based on various factors, such as the ambient light of the scene, detected ranges of luminosity, tone, or other optical parameters in the scene, or the like. HDR images may be produced by capturing multiple images, each using different exposure or other image-capture parameters, and producing a composite image from the multiple captured images.

The sensor array 141 may also include or be configured to operate in an object detection mode, in which a user can select (and/or the device 100 can automatically identify) objects within a scene to facilitate those objects being processed, displayed, or captured differently than other parts of the scene. For example, a user may select (or the device 100 may automatically identify) a person's face in a scene, and the device 100 may focus on the person's face while selectively blurring the portions of the scene other than the person's face. Notably, features such as the HDR mode and the object detection mode may be provided with a single camera (e.g., a single lens and sensor).

The sensor array 141 may also include a depth sensing device that is configured to estimate a distance between the device and a separate object or target. The depth sensing device may estimate a distance between the device and a separate object or target using lasers and time-of-flight calculations, or using other types of depth sensing components or techniques.

The device 100 may also include a flash (e.g., a rear-facing flash) that is configured to illuminate a scene to facilitate capturing images with the cameras of the sensor array 141. The flash is configured to illuminate a scene to facilitate capturing images with the sensor array 141. The flash may include one or more light sources, such as one or more light-emitting diodes (e.g., 1, 2, 3, 4, or more LEDs).

The sensor array 141 may also include a microphone. The microphone may be acoustically coupled to the exterior environment through a hole defined in the rear cover of the device 100 (e.g., through the portion of the rear cover that defines the protrusion).

Figure 1C:
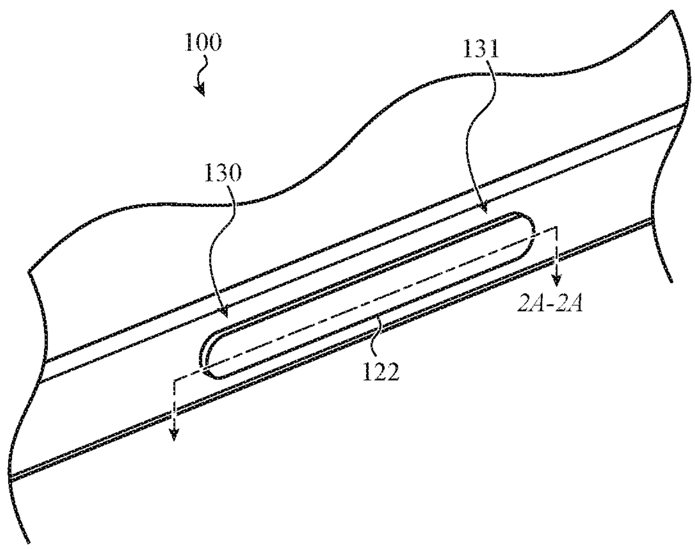

FIG. 1C illustrates a portion of the device 100 showing the button 122 that may be provided along a side exterior surface of the device housing. The button 122 may accept user inputs and cause the device 100 to perform one or more operations in response to the user inputs. The button 122 may include or be integrated with multiple sensing and haptic systems to accept different types of unique inputs and respond differently to the inputs. For example, the button 122 (or the button system more generally) may include or be associated with a strain sensing system and a switch element, which together allow the device to detect inputs having different force thresholds. The strain sensing system of the button may also allow the device to determine where, on the input member, the input was provided (e.g., which region of the button 122 was pushed). As described, different types of inputs (e.g., different input forces, different locations) may be associated with different functions and tactile outputs, as described herein.

In some cases, the button 122 may control image capture functions of the device. For example, the device 100 may be configured to capture an image (e.g., using the camera 106 or a camera of the rear-facing sensor array 141) in response to detecting a particular input to the button 122 (e.g., a full press, corresponding to actuation of a dome switch). The device 100 may capture an image in response to the input (e.g., the full button press) regardless of the mode of the device, and even when the device is not displaying an image capture user interface. This may allow the user to access image capture functionality of the device quickly and without having to interact with the touchscreen to launch an image capture user interface or application. In some cases, the particular input may also cause an image capture user interface to be displayed, while in other cases the device simply captures the image but does not change its mode, active application, active user interface, or the like. Thus, in the latter case, a user can quickly capture images without having to change applications, user interfaces, or otherwise disrupt their interactions with the device.

In some cases, the device 100 may be configured to launch an image capture user interface in response to detecting a different input at the button 122. For example, a partial press of the button (e.g., corresponding to a force input that is less than the force that results in the dome switch being actuated), may cause the device to launch an image capture interface (and optionally produce a haptic output, as described herein). Accordingly, the single button 122 provides a single physical input system that affords multiple input options to produce different device operations.

In some cases, a partial press of the button 122 has different outcomes depending on the mode or status of the device 100. For example, as described above, when the device 100 is not actively displaying an image capture user interface, a partial press may result in the device 100 launching the image capture user interface. However, if the image capture user interface is active, a partial press on the button 122 may have a different effect. For example, a partial press may cause the camera to initiate a camera focusing operation, a zoom operation (e.g., zooming in or zooming out), an image exposure or metering operation (e.g., locking an exposure setting), a flash setting (e.g., toggling a flash on or off), or the like.

As described herein, the button 122 (or the button system more generally) may be configured to determine a location of a force input on the button 122, and may take different actions based on the location of the input. Thus, pressing on a first region 130 of the button 122 (e.g., proximate a first end of the input member) may cause the device to perform a first action, and pressing on a second region 131 of the button 122 (e.g., proximate a second end of the button 122) may cause the device to perform a second action. For example, pressing on the first region 130 may result in a zoom-in operation, while pressing on the second region 131 may result in a zoom-out operation. Other example operations that may be initiated by pressing on the different regions may include setting (e.g., increasing/decreasing) image capture parameters (e.g., exposure, brightness, shutter speed, aperture, sharpness, white balance, exposure compensation, sensitivity, film speed equivalent, and the like).

Other example image manipulation and/or camera function controls that can be initiated by inputs to the button 122 (force and/or touch inputs) may include: zooming in or zooming out in response to swipe inputs on the button surface in different directions; increasing or decreasing volume output in response to swipe inputs on the button surface in different directions; capturing a single image or a series of multiple images in response to different force inputs (e.g., single image for a light press, multiple images for a harder press). In such cases, different haptic outputs may be produced in response to detecting different inputs at the button 122 and/or in response to the different operations that are initiated by the button inputs.

The button 122, and/or a device incorporating the button 122, may be configured to perform different actions based on inputs having different force thresholds. For example, as described herein, the button 122 may be responsive to a partial press and a full press, where a partial press corresponds to a press that does not actuate a switch element, and a full press does actuate the switch element. In some cases, the button 122 (or the device more generally) may be responsive to inputs that a user does not necessarily perceive as including a force component, but which are nonetheless detectable by the strain and/or force sensing elements of the buttons. For example, a user may gently tap the button 122, or slide a finger along the button (or provide another gesture). Such inputs may not produce a translation or deflection that is perceptible to the user, but which is detectable by the strain and/or force sensing elements. The device may be responsive to these types of inputs as well. In particular, the device may detect a touch or tap input (and optionally a location of the touch or tap), and perform an action in response to detecting the input (and optionally based on the location of the touch or tap). For example, a touch or tap input on one side of the input member may result in a first action (e.g., launching a first application, scrolling a list or cursor in a first direction, moving a graphical object on a display in a first direction, etc.), and a touch or tap input on a second side of the input member may result in a second action (e.g., launching a second application, scrolling a list or cursor in a second direction, moving a graphical object on a display in a second direction, etc.). As another example, a gesture input (e.g., a finger sliding along a surface of the input member) may cause the device to take an action based on the direction, speed, and/or other parameter(s) of the gesture (e.g., zooming in or out based on gesture direction, scrolling a list based on gesture direction, moving a graphical object on a display based on gesture direction, increasing or decreasing device volume based on gesture direction etc.). As noted, parameters of the actions may be scaled by the speed of the gesture (e.g., the speed of a zoom operation, scrolling or other display operation, etc., may be based on the speed of the gesture). Thus, as described above, the button 122 may facilitate multiple different types of inputs, as perceived by a user, such as touch and tap inputs (e.g., inputs that are not perceived by a user as being "pushes" of the button), partial presses (e.g., inputs that resemble a "half click" or other partial actuation that does not translate the button to its maximum travel), and full presses (e.g., inputs that resemble a "full click" or otherwise translate the button to its maximum travel).

In some cases, whether the device 100 differentiates between press inputs applied at different locations on the input member depends at least in part on an active user interface, mode, or other status of the device. For example, if a user interface other than an image capture user interface is active (or the screen is inactive or the device is otherwise in an inactive mode), the device 100 may not respond differently to different press locations (e.g., the device will respond in the same way to inputs regardless of where on the button the input was applied). In such cases, the device may perform a certain action in response to an input (e.g., a partial or full press) regardless of the location. For example, a partial press (e.g., a press satisfying a first force threshold) may result in the device initiating the image capture user interface, regardless of where the force input was applied on the input member, and a full press (e.g., a press satisfying a second force threshold) may result in the device capturing an image, regardless of where the force input was applied on the input member. If the image capture user interface is active when the button is pushed, on the other hand, the device may perform different actions based on the location of the input, as described above (e.g., changing image capture settings, zooming, etc.)

In some cases, the button 122 may be configured to control device functions other than image capture functions. For example, the button 122 may control a volume of the device by allowing a user to press on opposite ends of the button 122. As another example, the button 122 may control a ringer mode of the device, or may be configured to launch a different application or user interface (e.g., a gaming user interface, a music user interface, etc.).

The button 122 can also cause the device to perform other functions that are either tied to the operation of the device or set in response to operation of a particular application or use mode on the phone. For example, inputs to the button 122 may cause the device to perform operations such as: selecting one or more alert suppression (mute) modes; verifying purchase or verify application command; controlling timer commands including watch-related operations; providing input to games such as throttle control or other continuously variable inputs; initiating hard and/or soft reset of the device; initiating user programmable operations; and launching or terminating applications. In some cases, the particular operation of the button may be user programmable or selectable. For example, a user may select what functions or operations are initiated in response to various force inputs, gesture inputs, and touch inputs. The user may also establish different input schemes for different device modes. For example, the user may map force, touch, and gesture inputs to a first set of functions when the device is operating in a first mode (e.g., when a first application is being executed), and may map force, touch, and gesture inputs to a second set of functions when the device is operating in a second mode (e.g., when a second application is being executed).

In some cases, the operation of the button 122 may change based on the orientation of the device. For example, if the device is being held in a vertical or "portrait" orientation, the force, touch, and gesture inputs may map to a first set of functions, and if the device is being held in a horizontal or "landscape" orientation, the force, touch, and gesture inputs may map to a second set of functions.

FIGS. 2A-2D depict partial cross-sectional views of a simplified example of a button 210 that uses a sensing system (e.g., a strain sensing system) and a switch element (e.g., a dome switch) to detect various types of inputs. The button 210 may be incorporated into a device 200 and may correspond to or be an embodiment of the button 122 in FIGS. 1A-1C, or any other buttons described herein. The device 200 may correspond to or be an embodiment of the device 100. The descriptions of the button 122 and the device 100 will be understood to apply equally to the button 210 and device 200.

The button 210 includes an input member 211. The input member 211 may define an interface or input surface that a user presses in order to actuate the button 210. The input member 211 may be configured as a dual-input button with different actuation regions 206, 208 (e.g., proximate opposite ends of the input member 211). In some instances, when a user presses on the first actuation region 206, the device performs a first action (e.g., performing a zoom-in operation), and when a user presses on the second actuation region 208, the device performs a second action (e.g., performing a zoom-out operation). Other operations may also be performed based on the location of the input, and optionally a force of the input at that location. Also, as described herein, in some cases, the location of the force does not have an effect on the device's response.

The input member 211 may include posts 212-1, 212-2 that extend through holes formed in the housing 213. The posts 212 may be coupled to a plate 225 that moves with the input member 211 and, more generally, transfers input forces applied to the input member 211 to other components of the system. The plate 225 may also define the unactuated position of the input member 211 (e.g., the maximum limit of outward travel of the input member 211), and ultimately retain the input member 211 to the housing 213. In some cases, other structures or configurations are used to couple an input force applied to the input member 211 to internal components and structures (e.g., the structures supporting strain sensing elements). The button 210 may further include a shim member 226 and a beam structure 216.

The beam structure 216 may be at least partially constrained, relative to the housing 213, such that forces imparted on the beam structure 216 (e.g., via the plate 225 and the shim member 226 in the illustrated example) cause one or more segments of the beam structure 216 to be deflected relative to the housing 213 and/or other components of the device. The beam structure 216 may include compliant segments 217-1, 217-2 positioned proximate the ends of the beam structure 216. The compliant segments 217 may be configured to deflect in response to force inputs (e.g., press inputs) applied to the input member 211. More particularly, the compliant segments 217 may be deflected differently depending on the location of the force input on the input member 211, as described herein. In some cases, the compliant segments 217 are constrained at one side, and are unconstrained (over at least some travel distance) at another side. For example, in the example of FIGS. 2A-2D, the compliant segments 217 are constrained at their outer sides (e.g., where the compliant segments 217 are coupled to the housing 213 via brackets 219), and unconstrained at their inner sides (e.g., where the compliant segments 217 are nearest the switch element 222). Other configurations of the beam structure 216 and the compliant segments are also contemplated, such as a beam structure formed of a continuous, fully constrained structure (e.g., a unitary metal component) that includes compliant segments that are sufficiently flexible to be deflected by force inputs to the button 210. While the brackets 219 are shown as separate components from the beam structure 216, this is merely an example, and the brackets 219 and beam structure 216 may be formed as a unitary component (e.g., a monolithic piece of metal, which may be machined, molded, and/or otherwise formed to provide the functions of the brackets 219, beam structure 216, and optionally bracket 221).

Sensing elements 214-1, 214-2 may be coupled to the beam structure 216 and may detect deflection of the beam structure 216 as a result of inputs to the input member 211. The sensing elements 214 may be or may include strain sensing elements (e.g., strain gauges, piezoelectric and/or piezoresistive materials, etc.), or other components or materials that detect deflection of the beam structure 216 (optionally in conjunction with other circuitry). The sensing elements 214 may produce a signal that varies continuously with the deflection of the beam structure 216 (e.g., as opposed to a switch that produces only a binary or discontinuous signal). The sensing elements 214 may be coupled to any portion of the beam structure 216 (or other deflectable structure) that deflects in response to force inputs. For example, as shown in FIGS. 2A-2D, the sensing elements 214 are coupled to the compliant segments 217.

Input forces applied to the input member 211 may be coupled to a beam structure (e.g., compliant segments of the beam structure) in various ways. For example, FIGS. 2A-2D illustrate a shim member 226 (or simply shim 226) that transfers the input forces to the compliant segments 217 of the beam structure 216. The shim member 226 may include actuation members 227-1, 227-2 that contact or otherwise apply force to the compliant segments 217-1, 217-2. By providing separate actuation members for each compliant segment, the shim 226 may cause the compliant segments to deflect differently based on the location of the input force. For example, an input force applied at the actuation region 206 will result in comparatively more force being applied to the compliant segment 217-1 through the actuation member 227-1, and thus producing greater deflection of the compliant segment 217-1 (as compared to compliant segment 217-2).

The shim 226 may also transfer input forces from the input member 211 to a switch element 222. The switch element may be mounted to a portion of a bracket 221, which may generally support the switch element 222 during actuation. The switch element 222 may be mounted to a central portion of the beam structure 216 between a first end and a second end of the beam structure 216 (e.g., where the strain sensing elements are positioned). In some cases, the bracket 221 may be part of the beam structure 216. In such cases, the compliant segments 217 and the bracket 221 may be defined by a unitary structure, with the compliant segments 217 defined by slots, cuts, or other features of the unitary beam structure 216 that define cantilevered tongue- or beam-like structures.

The switch element 222 may be a dome switch or other switch element that is configured to be actuated or collapsed when subjected to a certain force. As used herein, a switch element may be considered to be actuated when the switch element transitions from one state to another state. For example, in the context of a dome switch, the switch is actuated when the dome collapses, thus closing (or optionally opening) an electrical circuit (which can be detected as an input or input event). The switch element may collapse when the force applied thereto reaches an actuation force (e.g., at a force threshold).

The shim 226 may be configured so that input forces are applied simultaneously to the switch element 222 and the compliant segments 217 of the beam structure 216. Thus, the strain sensing elements 214 may detect the force of the input before the force reaches the actuation force of the switch element 222. In this way, the device can respond to force inputs that are not forceful enough to collapse or actuate the switch element (e.g., inputs having a first force threshold that is lower than the actuation force of the switch element 222). In some cases, the shim 226 (or the input button system more generally) may be configured such that the input member 211 does not impart forces onto one or the other of the compliant segments or the switch element 222 during an initial travel of the input member 211. For example, a gap may exist between the shim 226 and the switch element 222, such that an input force will begin deflecting the compliant segments prior to any force being applied to the switch element 222. In some cases, introducing such a gap or otherwise staging the force transfer to the compliant segments (e.g., the continuous force sensing system) and the switch element (e.g., the binary force sensing system) may allow the tactile feel of the button 210 to be tuned.

In some cases, the switch element 222 and/or the compliant segments 217 (or the beam structure more generally 216) may bias the input member 211 into its undepressed or unactuated position, and may have a stiffness that provides a tactile resistance to the input force (such that the user can tactilely feel that they are pressing against a button that has some compliance while also providing some resistance).

Figure 2A:
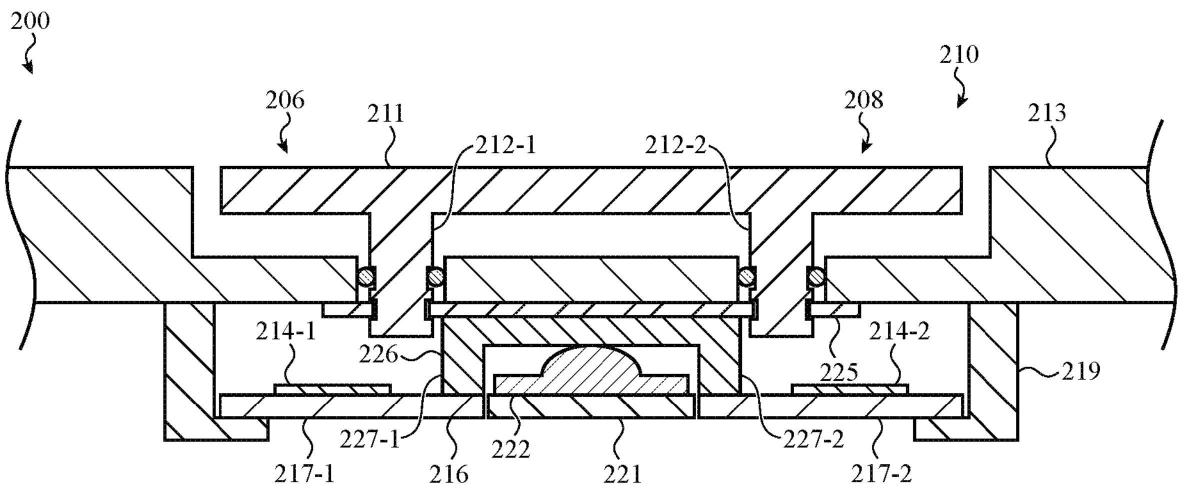
FIGS. 2A-2D depict a partial cross-sectional view of an example input button.
Figure 2B:
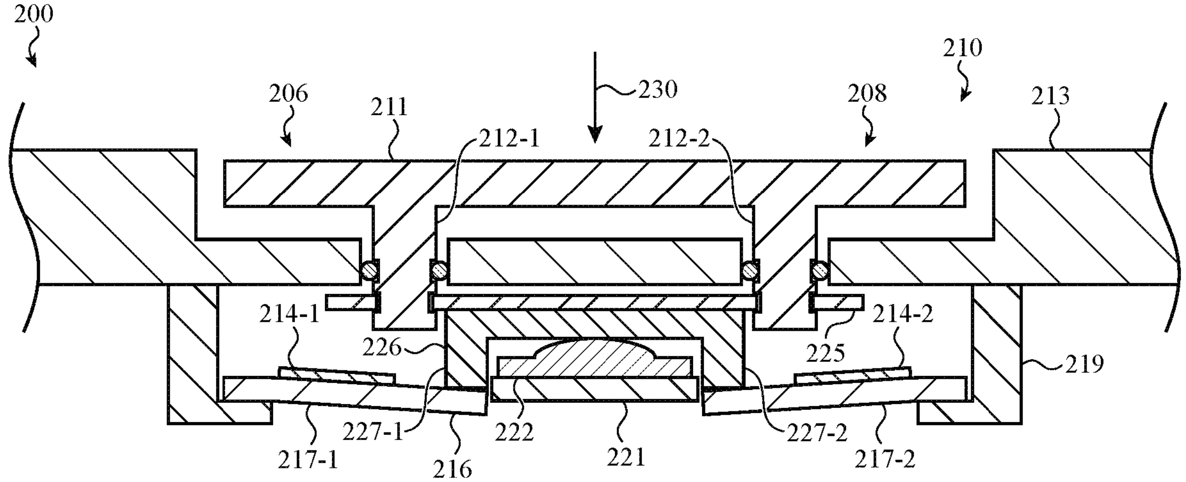
Figure 2C:
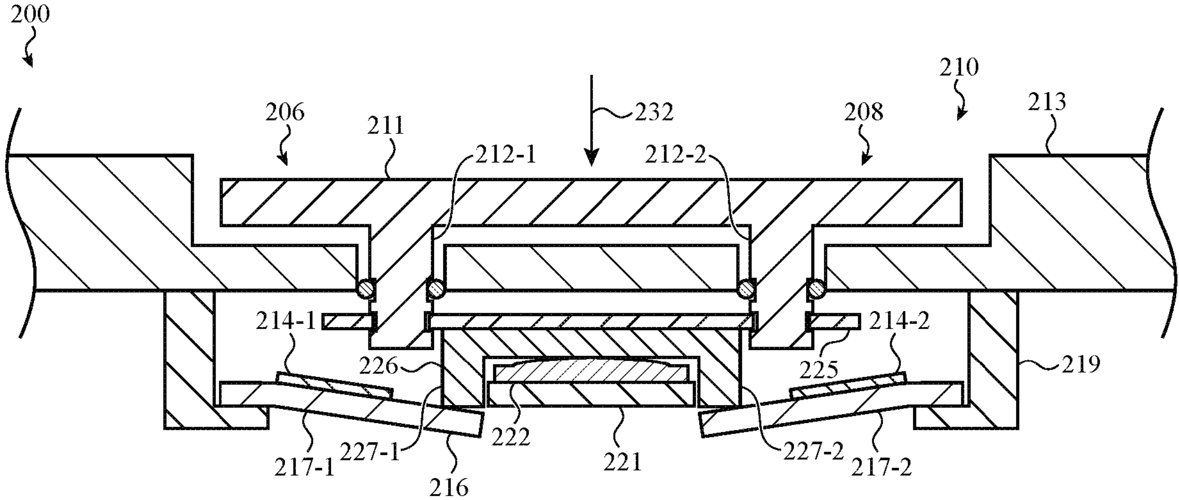
Figure 2D:
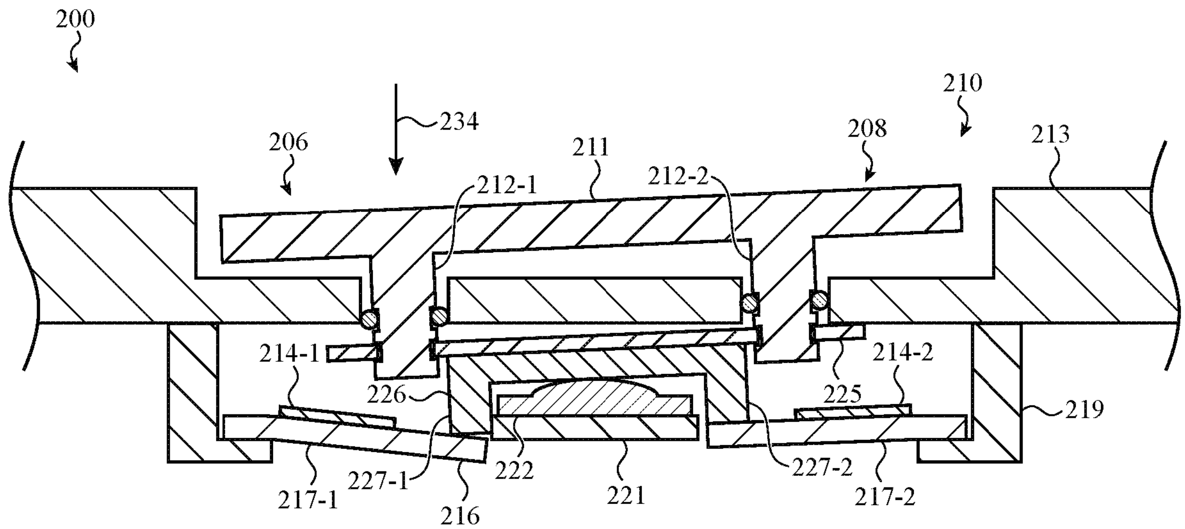

FIGS. 2B-2D illustrate the button 210 at various states in response to various input forces. For example, FIG. 2B illustrates the button 210 subjected to a force 230. In this case, the force 230 is generally centered (e.g., applied to a central portion or region of the input member 211), and thus the compliant segments 217 are generally deflected equally. Moreover, the force 230 is below an actuation force or actuation threshold for the switch element 222. Thus, as a result of the input, the compliant segments 217 are deflected, and the switch element is partially deformed but has not yet been actuated or collapsed. FIG. 2B may illustrate the button response at a first force threshold. More particularly, in response to detecting that the force input satisfies the first force threshold, as determined at least in part based on at least one of a first signal from the first strain sensing element 214-1 or a second signal from the second strain sensing element 214-2, the device may perform an action (e.g., initiating or transitioning to an image capture user interface). As described herein, the device may also cause a haptic actuator to produce a tactile output in response to detecting that the force input satisfies the first force threshold.

As noted, FIG. 2B may show the button response at a first force threshold. The first force threshold may be between about 0.8 Newtons and about 1.2 Newtons, or between about 0.5 Newtons and about 1.5 Newtons (or another suitable range). The travel distance of the input member 211 when the first force threshold is satisfied may be between about 40 microns and about 100 microns.

FIG. 2C illustrates the button 210 subjected to a force 232, which is greater than the force 230 in FIG. 2B. The force 232 is generally centered, and thus the compliant segments 217 are generally deflected equally. In this case, the force 232 is at or above the actuation force of the switch element 222 (e.g., the force 232 satisfies a second force threshold that is greater than the first force threshold), resulting in the switch element 222 collapsing (or otherwise being actuated). In response to detecting that the switch element 222 has been actuated (e.g., collapsed), the device may perform an action (e.g., capturing an image with a camera). As described herein, the actuation of the switch element 222 may also produce a tactile output, which may provide a tactile indication that the button has been fully pressed. In some cases, the tactile output produced by the haptic actuator in response to the first force threshold may be different from the tactile output from the switch element 222, such that the user can easily differentiate between the input types.

As noted, FIG. 2C may show the button response at a second force threshold. The second force threshold may be between about 2.0 Newtons and about 4.5 Newtons, or between about 3.0 Newtons and about 4.0 Newtons (or another suitable range). The travel distance of the input member 211 when the second force threshold is satisfied may be between about 100 microns and about 200 microns. In some cases, a difference between the first force threshold and the actuation force of the switch element 222 (e.g., the second force threshold) is between about 0.5 Newtons and about 1.5 Newtons.

FIG. 2D illustrates the button 210 subjected to a force 234. In this example, the force 234 is applied to the first actuation region 206 of the input member 211 (e.g., off-center). The off-center force results in the compliant segment 217-1 deflecting more than the compliant segment 217-2 (or, more generally, deflecting differently), which may be reflected by the signals produced by the strain sensing elements 214-1, 214-2. More generally, the device 200 may correlate different sets of signals from the sensing elements 214 to different force input locations. In this way, the device can differentiate between different inputs to a single input member of unitary construction.

Based at least in part on the signals from the sensing elements, the device may determine the location of the input on the input member 211. In some cases, the device may perform an operation in response to determining that a force that satisfies a certain force threshold was received at a certain location (or region) of the input member 211. The force threshold may correspond to the first force threshold (e.g., the same force threshold that triggers an action from a generally centered force input), the second force threshold (e.g., the device may perform the particular operation based on the location of the force once the switch element is actuated), or a different force threshold.

In some cases, different locations (e.g., different actuation regions of an input member) may be associated with different sets of staged force thresholds. Thus, for example, the first actuation region 206 may be associated with a first force threshold and a second force threshold (and first and second operations that are initiated in response to the thresholds being satisfied), while the second actuation region 208 may be associated with a third force threshold and a fourth force threshold (and third and fourth operations that are initiated in response to the thresholds being satisfied). As one example application, the first actuation region 206 may be selectable to zoom a camera in a first direction at a first speed (first force threshold and first operation) and zoom the camera in the first direction at a second speed (second force threshold and second operation), while the second actuation region 208 may be selectable to zoom the camera in a second direction at a first speed (third force threshold and third operation) and zoom the camera in the second direction at a second speed (fourth force threshold and fourth operation). The device may be configured with other conditions and corresponding operations as well. Moreover, the particular thresholds at which operations are initiated or triggered and the operations themselves may be dynamic, and may differ based on a state or mode of operation of the device (e.g., an application that is being executed, a user interface that is being displayed, etc.).

In some cases, the device may be capable of distinguishing input locations on the input member 211 to a resolution of about 1.0 mm, about 2.0 mm, about 3.0 mm, or another suitable resolution. In some cases, the device distinguishes the input locations to a greater resolution than is necessary for the button functions. For example, the device may determine the location of an input on the input member 211 to a resolution of about 1.0 mm. If the location is within a first region of the input member 211 (e.g., within an about 10 mm area defining the first actuation region 206), the device may perform a first operation, and if the location is within a second region of the input member 211 (e.g., within an about 10 mm area defining the second actuation region 208), the device may perform a second operation different from the first operation.

Because the device can determine the location of an input applied to the input member 211, the device may detect and respond to gesture inputs applied to the input member 211. As used herein, a gesture input may include a directional component, such as a swipe along length of the input member 211 (e.g., along the horizontal axis in FIG. 2A). As a user applies a gesture along the input surface of the input member 211 (e.g., the exterior surface that is contactable by a user), the device may determine one or more parameters of the gesture. Such parameters may include a direction of the gesture (e.g., a swipe direction), speed of the gesture, start/stop locations of the gesture, or the like. Such parameters may be determined based on the signals from the sensing elements 214, and may correspond to deflections of the compliant segments 217 or the beam structure 216 more generally. Thus, such gesture inputs may be detectable to the extent that they produce detectable deflections in the beam structure 216. While a swipe gesture is described, other types of gesture inputs or inputs that include directions and/or motions are also contemplated. For example, a user may apply a "rocking" gesture to the input member 211, where the entire input member 211 receives a force, but a primary force location (e.g., a centroid of the force input) changes with time (e.g., as if a user rocks a finger or thumb from the first actuation region 206 to the second actuation region 208). Because the deflection of the beam structure 216 changes in accordance with the location of the primary force location, parameters of such a gesture input may be determined and the device may perform operations based on the determined parameters.

Example operations that may be performed in response to gesture inputs include, without limitation, zooming a camera, changing image capture parameters, changing audio output volume, scrolling displayed objects, changing display brightness (or any other device parameters), locking and/or unlocking the device, sending an information item (e.g., sending an email or text message), refreshing content (e.g., refreshing a webpage), and the like. As described herein, gesture inputs may be accompanied by a partial press or partial actuation of a button (e.g., inputs that a user perceives as including a pressing force onto the button), or they may resemble touch inputs (e.g., inputs that a user perceives as merely touching the button without applying a translational force).

As noted above, the device may determine a location of an input on the input member 211 based on one or more signals from the sensing elements 214. The signals may be or may correspond to an electrical signal and/or an electrical characteristic. For example, if the sensing elements 214 are or include strain gauges, the signals may be voltages that vary based on the change in resistance of the strain gauges as the beam structure 216 is deflected. Other types of signals may be produced based on the particular type of sensing element used.

As noted above, the sensing elements 214 may be configured to produce a signal that varies continuously with the force applied to the input member 211. In some cases, the device may perform an operation in a manner that is scaled relative to the signal from a sensing element. For example, a rate of change of a parameter may be scaled relative to the amount of deflection or force indicated by the sensing element (e.g., a harder press results in greater deformation and thus a greater rate of change of the parameter). As one example, a rate of change of a zoom level may be scaled based on the deflection (e.g., corresponding to the force applied to the button 210). As another example, a rate of change of a device volume may be scaled based on the deflection. Deflection need not only be used to scale rates of change. For example, a value of a parameter may be scaled based on the force applied to the input button. As an example, during an operation to set an aperture value, exposure value, screen brightness, or the like, the parameter value may be scaled based on the force or deflection (e.g., a higher force/deflection results in a higher parameter value).

As noted above, a device may determine whether a particular input satisfies a condition (e.g., a force threshold) based at least in part on signals or information from sensing elements 214 (which may be strain sensing elements). Determining whether an input satisfies a condition may be performed in various ways, depending on factors such as the type of sensing element 214 (e.g., strain gauge, piezoresistive element, optical, etc.) and the type of condition being evaluated (e.g., force, deflection, distance, angle, etc.). In some cases, signals from the sensing elements 214 may be correlated or associated with certain values, such as force, distance, etc. As one example, a device may determine whether an input force satisfies a force value (e.g., a force threshold). In some cases, conditions are based on a value of a signal or other property of the sensing element. As one example, a device may determine whether a voltage measured across a strain gauge satisfies a voltage condition (which generally correlates to the amount of strain or deflection experienced by the strain gauge and to the magnitude of the force being applied). Other techniques are also contemplated. It will be understood that a device may determine whether a force input satisfies a force threshold without ever determining an actual force value (e.g., the device can determine that a force threshold has been satisfied by determining that a signal from a strain gauge satisfies a certain condition).

While the button 210 is shown as having two strain sensing elements, in some implementations, more or fewer strain sensing elements may be used. In some cases, only a single strain sensing element is used (e.g., one or the other of elements 214 may be omitted). In such cases, the button 210 may detect a magnitude force applied to the button (or otherwise differentiate between forces of different magnitudes), but may not have the ability to determine, based on strain or force values, a location of a force input on a button member.

FIGS. 3A-3D depict partial cross-sectional views of a simplified example of an example button 310 that uses a sensing system (e.g., a strain sensing system) and a switch element (e.g., a dome switch) to detect various types of inputs. The button 310 may be incorporated into a device 300 and may correspond to or be an embodiment of the button 122 in FIGS. 1A-1C, or any other buttons described herein. The device 300 may correspond to or be an embodiment of the device 100. The descriptions of the button 122 and the device 100 will be understood to apply equally to the button 310 and device 300.

The example button 310 in FIGS. 3A-3D may provide continuous force sensing, input location sensing, and binary force sensing capabilities, as described herein. Input location sensing may also facilitate gesture sensing, as described herein.

The button 310 includes a beam structure 316, which may be a unitary structure (e.g., a single piece of metal, polymer, composite, or other material), which is deflected in response to input forces. A switch element 322 may be positioned below the beam structure, such that the beam structure couples the force from the input to the switch element 322. The beam structure 316 may be supported by a bracket 319 (which may be coupled to the device housing 313 or otherwise configured to support the beam structure 316). While the brackets 319 are shown as separate components from the beam structure 316, this is merely an example, and the brackets 319 and beam structure 316 may be formed as a unitary component (e.g., a monolithic piece of metal, which may be machined, molded, and/or otherwise formed to provide the functions of the brackets 319, and beam structure 316).

More particularly, the button 310 includes an input member 311. The input member 311 may define an interface or input surface that a user presses in order to actuate the button 310. The input member 311 may be configured as a dual-input button with different actuation regions 306, 308 (e.g., proximate opposite ends of the input member 311). In some instances, when a user presses on the first actuation region 306, the device performs a first action (e.g., performing a zoom-in operation), and when a user presses on the second actuation region 308, the device performs a second action (e.g., performing a zoom-out operation). Other operations may also be performed based on the location of the input, and optionally a force of the input at that location. Also, as described herein, in some cases, the location of the force does not have an effect on the device's response.

The input member 311 may include posts 312-1, 312-2 that extend through holes formed in the housing 313. The posts 312 may be coupled to a plate 325. In some cases, other structures or configurations are used to couple an input force applied to the input member 311 to internal components and structures (e.g., the structures supporting strain sensing elements). The plate 325 may also define the unactuated position of the input member 311 (e.g., the maximum limit of outward travel of the input member 311), and ultimately retain the input member 311 to the housing 313.

The beam structure 316 may be at least partially constrained, relative to the housing 313, such that forces imparted on the beam structure 316 (e.g., via the posts 312) cause one or more segments of the beam structure 316 to be deflected relative to the housing 313 and/or other components of the device. While the beam structure 316 may be constrained at both ends, the beam structure may be deflected differently depending on the location of the force input on the input member 311, such as described with respect to FIG. 3D.

Sensing elements 314-1, 314-2 may be coupled to the beam structure 316 and may detect deflection of the beam structure 316 as a result of inputs to the input member 311. The sensing elements 314 may be or may include strain sensing elements (e.g., strain gauges, piezoelectric and/or piezoresistive materials, etc.), or other components or materials that detect deflection of the beam structure 316 (optionally in conjunction with other circuitry). The sensing elements 314 may produce a signal that varies continuously with the deflection of the beam structure 316 (e.g., as opposed to a collapsible switch that produces only a binary or discontinuous signal). The sensing elements 314 may be coupled to any portion of the beam structure 316 (or other deflectable structure) that deflects in response to force inputs. For example, as shown in FIGS. 3A-3D, the sensing elements 314 are coupled to a bottom surface of the beam structure 316, though in other examples they may be positioned on a top surface of the beam structure 316.

Input forces applied to the input member 311 may be coupled to the beam structure via the posts 312. Thus, as described with respect to the shim 226 in FIG. 2A, input forces applied at different locations on the input member 311 may result in different deflections of the beam structure, which the device can use to determine the location of an input on the input member 311.

Similar to the button 210, the beam structure 316 and the switch element 322 may be configured such that the beam structure 316 deforms or deflects a certain amount before the switch element 322 is actuated. Accordingly, the button 310 may facilitate a multi-stage button (e.g., responsive to both partial and full presses), as described herein.

Figure 3A:
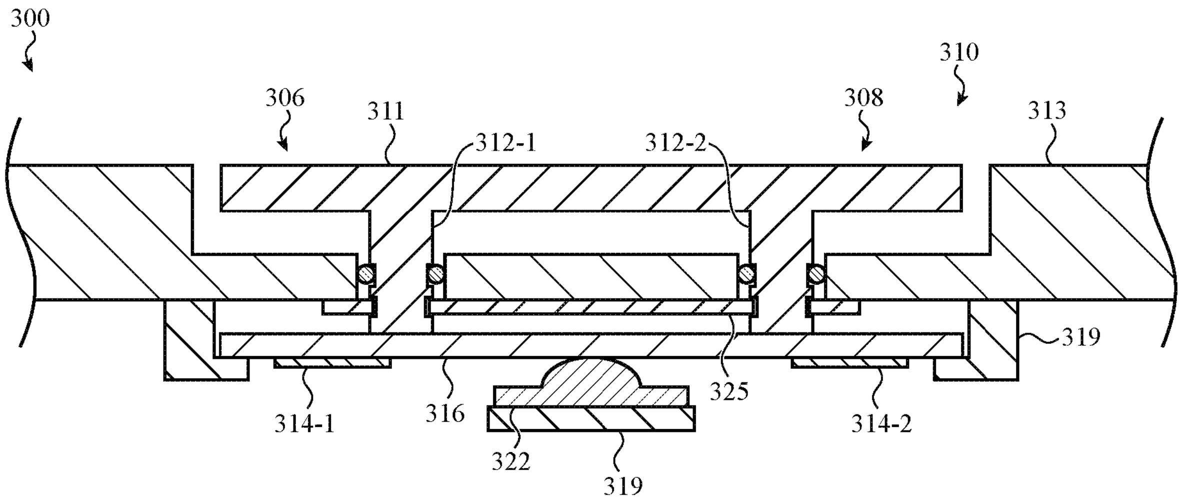
FIGS. 3A-3D depict a partial cross-sectional view of another example input button.
Figure 3B:
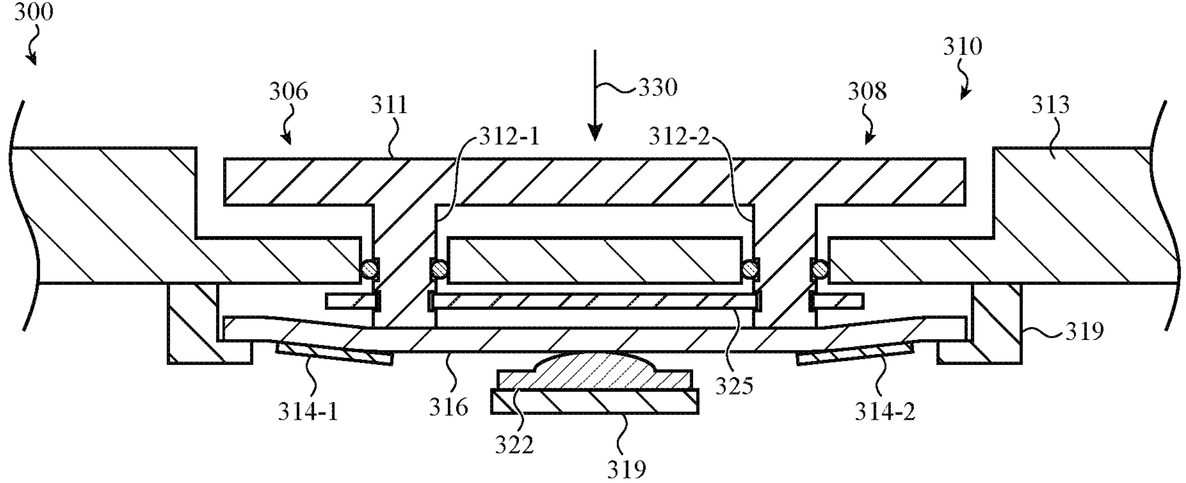
Figure 3C:
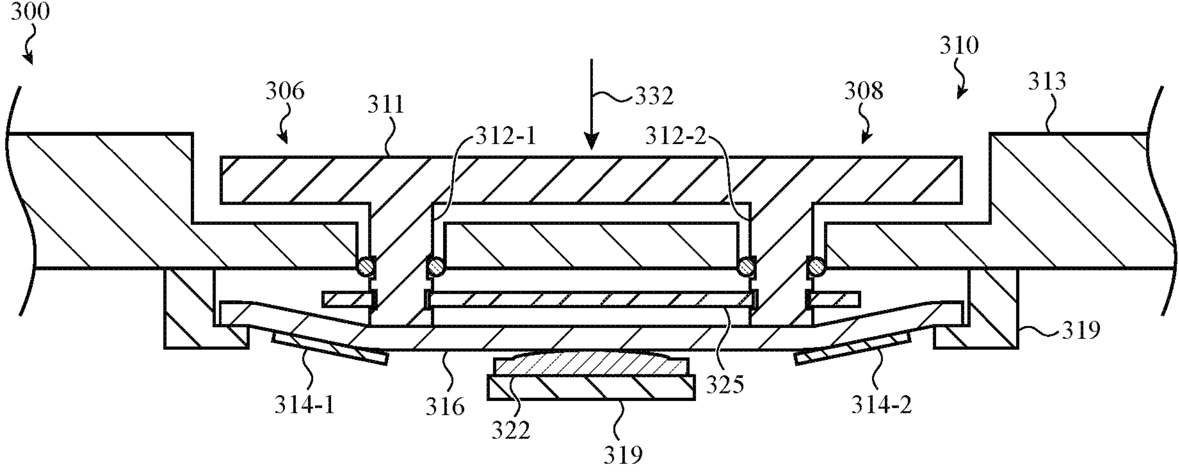
Figure 3D:
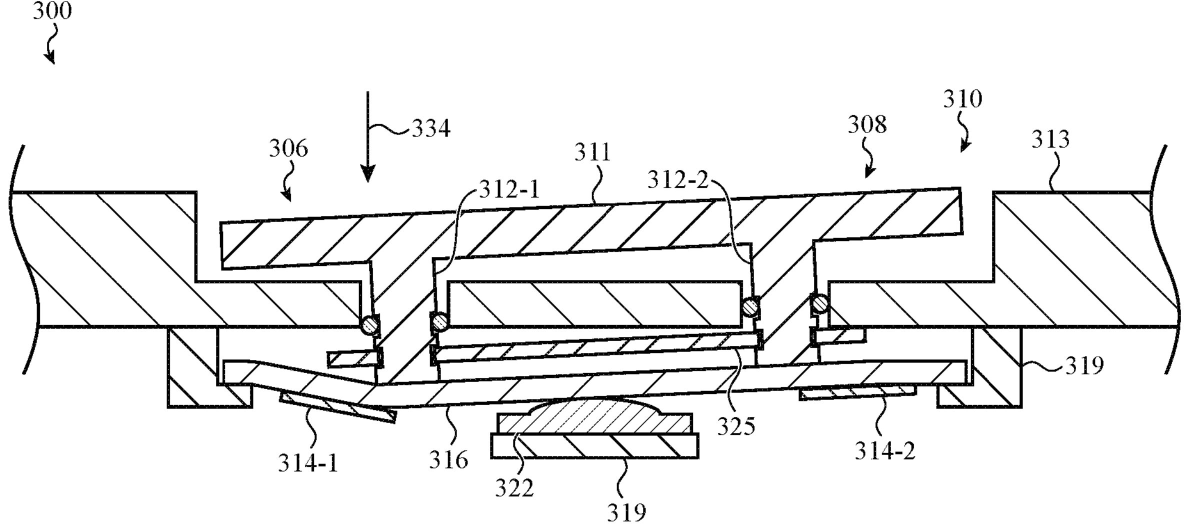

FIGS. 3B-3D illustrate the button 310 at various states in response to various input forces. For example, FIG. 3B illustrates the button 310 subjected to a force 330. In this case, the force 330 is generally centered, and thus the beam structure 316 is generally deflected symmetrically. Moreover, the force 330 is below an actuation force or actuation threshold for the switch element 322. Thus, as a result of the input, the beam structure 316 is deflected, and the switch element is partially deflected but has not yet been actuated (e.g., collapsed). FIG. 3B may illustrate the button response at a first force threshold. More particularly, in response to detecting that the force input satisfies the first force threshold, as determined at least in part based on at least one of a first signal from the first strain sensing element 314-1 or a second signal from the second strain sensing element 314-2, the device may perform an action (e.g., initiating or transitioning to an image capture user interface). As described herein, the device may also cause a haptic actuator to produce a tactile output in response to detecting that the force input satisfies the first force threshold.

FIG. 3C illustrates the button 310 subjected to a force 332, which is greater than the force 330 in FIG. 3B. In this case, the force 332 is at or above the actuation force of the switch element 322 (e.g., the force 332 satisfies a second force threshold that is greater than the first force threshold), resulting in the switch element 322 collapsing (or otherwise being actuated). In response to detecting that the switch element 322 has been actuated (e.g., collapsed), the device may perform an action (e.g., capturing an image with a camera). As described herein, the actuation of the switch element 322 may also produce a tactile output, which may provide a tactile indication that the button has been fully pressed. In some cases, the tactile output produced by the haptic actuator in response to the first force threshold may be different from the tactile output from the switch element 322, such that the user can easily differentiate between the input types.

FIG. 3D illustrates the button 310 subjected to a force 334. In this example, the force 334 is applied to the first actuation region 306 of the input member 311 (e.g., off-center). The off-center force results in the beam structure 316 being deflected asymmetrically (or otherwise deflected in a manner that can be used to differentiate input locations). More generally, the device 300 may correlate different sets of signals from the sensing elements 314 to different force input locations. In this way, the device can differentiate between different inputs to a single input member of unitary construction. Techniques for determining the location and magnitude of a force input based on signals from the strain sensing elements, and examples of how a device may respond to inputs at different locations and having different magnitudes, are described with respect to FIGS. 2A-2D, and that discussion will be understood to apply equally to the button 310. Additionally, techniques for detecting gesture inputs, and examples of how a device may respond to gesture inputs, are described with respect to FIGS. 2A-2D, and that discussion will be understood to apply equally to the button 310.

While the button 310 is shown as having two strain sensing elements, in some implementations, more or fewer strain sensing elements may be used. In some cases, only a single strain sensing element is used (e.g., one or the other of elements 314 may be omitted). In such cases, the button 310 may detect a magnitude force applied to the button (or otherwise differentiate between forces of different magnitudes), but may not have the ability to determine, based on strain or force values, a location of a force input on a button member.

Figure 4A:
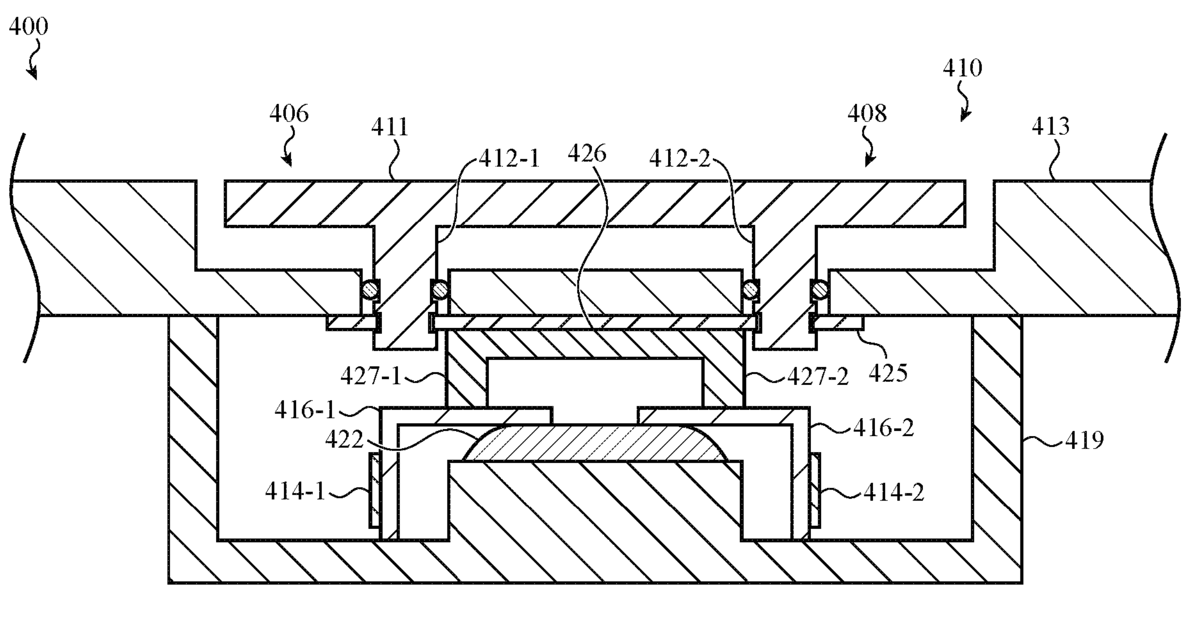
FIG. 4A depicts a partial cross-sectional view of another example input button.

FIG. 4A depicts a partial cross-sectional view of another example button 410 that uses a sensing system (e.g., a strain sensing system) and a switch element (e.g., a dome switch) to detect various types of inputs. The button 410 may be incorporated into a device 400*a* and may correspond to or be an embodiment of the button 122 in FIGS. 1A-1C, or any other buttons described herein. The device 400 may correspond to or be an embodiment of the device 100. The descriptions of the button 122 and the device 100 will be understood to apply equally to the button 410 and device 400.

The example button 410 in FIG. 4A may provide continuous force sensing, input location sensing, and binary force sensing capabilities, as described herein. Input location sensing may also facilitate gesture sensing, as described herein.

The button 410 includes beam structures 416-1, 416-2. The beam structures 416 are deflected in response to input forces, and support strain sensing elements 414 that are used to detect the strain resulting from the input forces. A switch element 422 may be positioned below the beam structures 416, such that the beam structures 416 couple the force from the input to the switch element 422 (e.g., the beam structures 416 deflect downward in response to an input, thereby imparting an actuation force on the switch element 422. The beam structures 416 may be supported by a bracket 419 (which may be coupled to the device housing 413 or otherwise configured to support the beam structures 416).

The button 410 includes an input member 411. The input member 411 may define an interface or input surface that a user presses in order to actuate the button 410. The input member 411 may be configured as a dual-input button with different actuation regions 406, 408 (e.g., proximate opposite ends of the input member 411). In some instances, when a user presses on the first actuation region 406, the device performs a first action (e.g., performing a zoom-in operation), and when a user presses on the second actuation region 408, the device performs a second action (e.g., performing a zoom-out operation). Other operations may also be performed based on the location of the input, and optionally a force of the input at that location. Also, as described herein, in some cases, the location of the force does not have an effect on the device's response.

The input member 411 may include posts 412-1, 412-2 that extend through holes formed in the housing 413. The posts 412 may be coupled to a plate 425. The plate 425 may also define the unactuated position of the input member 411 (e.g., the maximum limit of outward travel of the input member 411), and ultimately retain the input member 411 to the housing 413. The button 410 may also include a shim 426. The plate 425 (or other component) may interface with the shim 426 to transfer input forces to the beam structures 416. The shim member 426 may include actuation members 427-1, 427-2 that contact or otherwise apply force to the beam structures 416-1, 416-2, respectively. By providing separate actuation members for each compliant beam structure, the shim 426 may concentrate the forces from off-center input forces at certain locations on the beam structures 416 (e.g., such that the beam structures deflect differently based on the location of the input force). For example, an input force applied at the actuation region 406 will result in comparatively more force being applied to the beam structure 416-1 through the actuation member 427-1, and thus producing greater deflection of the beam structure 416-1 (as compared to beam structure 416-2). In some cases, a shim member may be a block or otherwise not define separate actuation members 427. In such cases, the shim member may still deflect the beam structures differently based on the location of the input force (e.g., such that a location of the input force can be determined based on the strain detected at each of the beam structures).

In some cases, other structures or configurations (e.g., instead of or in addition to the plate 425 and the shim 426) are used to couple an input force applied to the input member 411 to internal components and structures (e.g., the structures supporting strain sensing elements).

Sensing elements 414-1, 414-2 may be coupled to the beam structures 416-1, 416-2 and may detect deflection of the beam structures as a result of inputs to the input member 411. While the sensing elements 414 are positioned on a mounting surface of the beam structures that is not directly receiving the force from the input, the force may cause deformation or deflection of the mounting surface that is detectable by the sensing elements 414.

The sensing elements 414 may be or may include strain sensing elements (e.g., strain gauges, piezoelectric and/or piezoresistive materials, etc.), or other components or materials that detect deflection of the beam structures 416 (optionally in conjunction with other circuitry). The sensing elements 414 may produce a signal that varies continuously with the deflection of the beam structures 416 (e.g., as opposed to a collapsible switch that produces only a binary or discontinuous signal). The sensing elements 414 may be coupled to any portion of the beam structures 416 (or other deflectable structure) that deflects in response to force inputs.

Similar to the button 210, the beam structures 416 and the switch element 422 may be configured such that the beam structures 416 deform or deflect a certain amount before the switch element 422 is actuated. Accordingly, the button 410 may facilitate a multi-stage button (e.g., responsive to both partial and full presses), as described herein.

In some cases, the beam structures 416-1, 416-2 are discrete structures (e.g., formed of separate metal, polymer, composite, or other material components). In some cases, the beam structures 416 may be implemented as a single structures, such as a ring-like structure, optionally with a hole at the center of the top surface.

Input forces to the button 410 may produce a response that is substantially similar to other buttons described herein (e.g., the buttons 210, 310), and those discussions will be understood to apply equally to the button 410. For example, in response to an input force at a first force threshold (below the actuation force of the switch element 422), the beam structures 416 may deflect, causing the strain sensing elements to produce a corresponding signal indicative of the force. In response to an input force at a second force threshold (at or above the actuation force of the switch element 422), the switch element collapses or actuates. Further, the device 400 may determine a location of a force applied to the input member 411 based at least in part on the signals from the strain sensing elements.

Figure 4B:
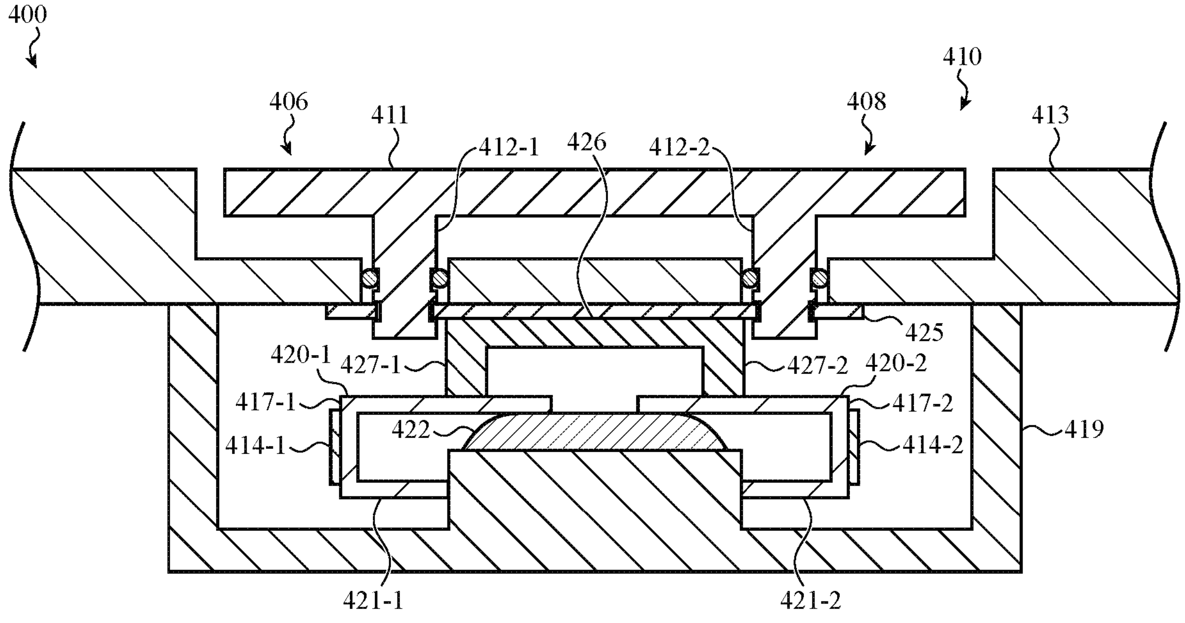
FIG. 4B depicts a partial cross-sectional view of another example input button.

FIG. 4B depicts another example of the button 410, but with a different set of beam structures 417-1, 417-2. In this example, the beam structures 417-1, 417-2 include elongated struts 420, 421, which extend generally parallel to the input surface of the input member 411, or otherwise position the strain sensing elements 414-1, 414-2 a distance away from the center of the button assembly. Increasing the length of the elongated struts 420-1, 420-2, 421-1, 421-2 may generally increase the strain experienced at the strain sensing elements 414 (which may improve the resolution, accuracy, or other aspect of the force sensing functionality). Increasing the length of the struts 420, 421 may also reduce the magnitude of force required to produce a particular strain value, which may allow the tactile feel of the button 410 to be tuned (e.g., to reduce the effect of the beam structures on the tactile feel, press force, or other parameter).

While the button 410 is shown as having two strain sensing elements, in some implementations, more or fewer strain sensing elements may be used. In some cases, only a single strain sensing element is used (e.g., one or the other of elements 414 may be omitted). In such cases, the button 410 may detect a magnitude force applied to the button (or otherwise differentiate between forces of different magnitudes), but may not have the ability to determine, based on strain or force values, a location of a force input on a button member.

Figure 5:
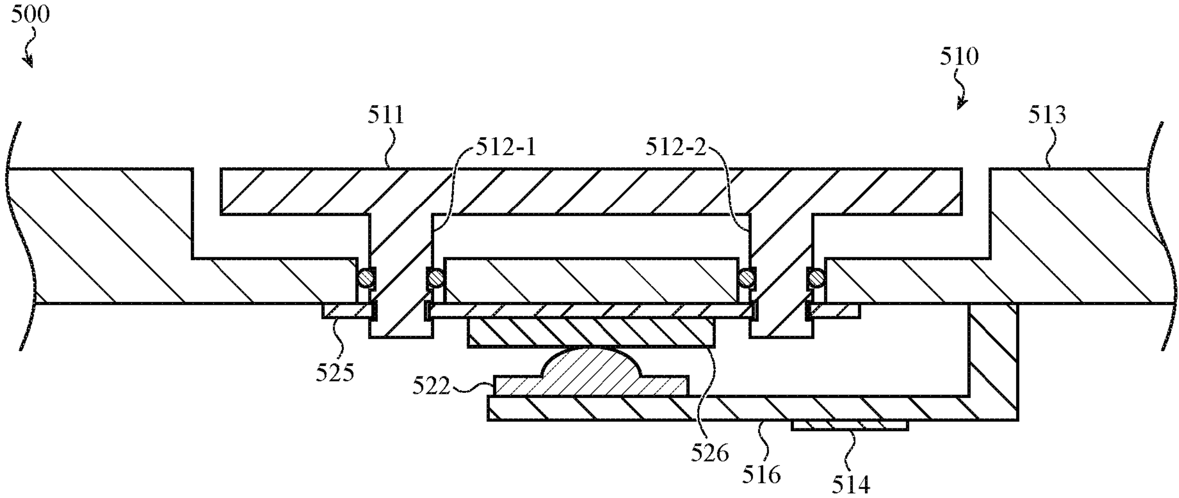
FIG. 5 depicts a partial cross-sectional view of another example input button.

FIG. 5 depicts a partial cross-sectional view of another example button 510 that uses a sensing system (e.g., a strain sensing system) and a switch element (e.g., a dome switch) to detect various types of inputs, as described herein. The button 510 may be incorporated into a device 500 and may correspond to or be an embodiment of the button 122 in FIGS. 1A-1C, or any other buttons described herein. The device 500 may correspond to or be an embodiment of the device 100. The descriptions of the button 122 and the device 100 will be understood to apply equally to the button 510 and device 500.

The example button 510 in FIG. 5 may be configured to provide continuous force sensing and binary force sensing capabilities, as described herein. The button 510 may use only a single strain sensing element, and as such, may not be configured to determine the location of an input on the input member 511 based on detected strain.

For example, the button 510 includes a beam structure 516. The beam structure 516 is deflected in response to input forces, and supports a strain sensing element 517 that is used to detect the strain resulting from the input forces. The beam structure 516 may be coupled to the device housing 513 or otherwise configured to a bracket or other component that couples the beam structure 516 to the device housing. As shown, the button 510 may include only a single beam structure and single strain sensing element, and as such, may not be able to determine, using the strain sensing element 517, the location of an input force on the input member 511.

A switch element 522 may be positioned below the input member 511 such that input forces applied to the input member 511 are transferred to the switch element 522. In some cases, the force may be coupled to the switch element 522 via a plate 525 and a shim 526, though other structures for imparting an actuation force on the switch element 522 are also contemplated.

The button 510 includes an input member 511. The input member 511 may define an interface or input surface that a user presses in order to actuate the button 510. The input member 511 may include posts 512-1, 512-2 that extend through holes formed in the housing 513. The posts 512 may be coupled to a plate 525. The plate 525 may also define the unactuated position of the input member 511 (e.g., the maximum limit of outward travel of the input member 511), and ultimately retain the input member 511 to the housing 513. The button 510 may also include a shim 526. The plate 525 (or other component) may interface with the shim 526 to transfer input forces to the beam structure 516 and the switch element 522.

Strain sensing element 514 may be coupled to the beam structure 516 and may detect deflection of the beam structure as a result of inputs to the input member 511. The sensing element 514 may be or may include a strain sensing element (e.g., strain gauge, piezoelectric and/or piezoresistive materials, etc.), or other components or materials that detect deflection of the beam structure 516 (optionally in conjunction with other circuitry). The sensing element 514 may produce a signal that varies continuously with the deflection of the beam structures 516 (e.g., as opposed to a collapsible switch that produces only a binary or discontinuous signal). The sensing element 514 may be coupled to any portion of the beam structures 516 (or other deflectable structure) that deflects in response to force inputs.

Similar to the button 210, the beam structure 516 and the switch element 522 may be configured such that the beam structure 516 deforms or deflects a certain amount before the switch element 522 is actuated. Accordingly, the button 510 may facilitate a multi-stage button (e.g., responsive to both partial and full presses), as described herein.

Input forces to the button 510 may produce a response that is substantially similar to other buttons described herein (e.g., the buttons 210, 310), and those discussions will be understood to apply equally to the button 510. For example, in response to an input force at a first force threshold (below the actuation force of the switch element 522), the beam structure 516 may deflect, causing the strain sensing element to produce a corresponding signal indicative of the force. In response to an input force at a second force threshold (at or above the actuation force of the switch element 522), the switch element collapses or actuates.

Figure 6A:
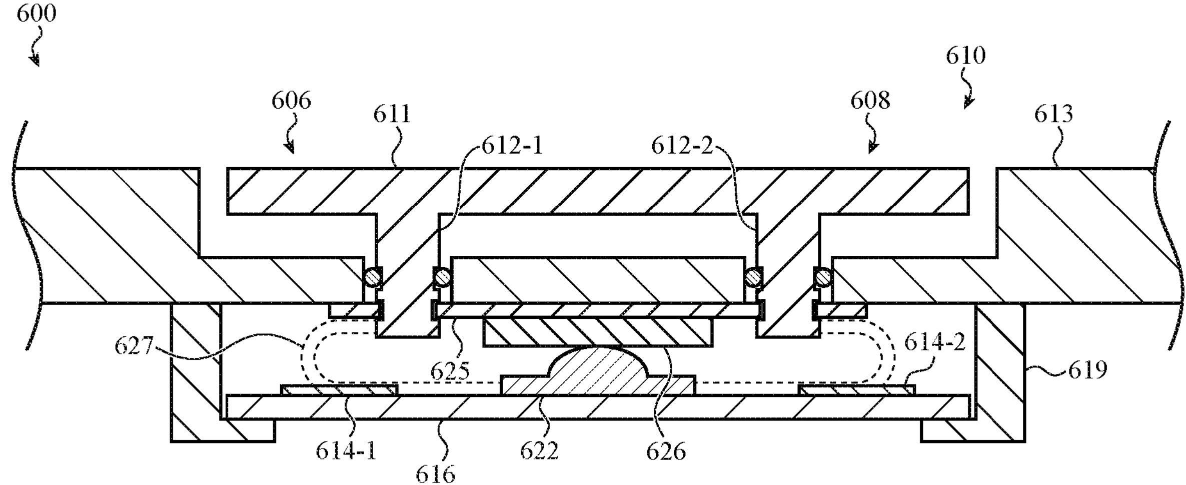
FIG. 6A depicts a partial cross-sectional view of another example input button.

FIG. 6A depicts a partial cross-sectional view of another example button 410 that uses a sensing system (e.g., a strain sensing system) and a switch element (e.g., a dome switch) to detect various types of inputs. The button 610 may be incorporated into a device 600 and may correspond to or be an embodiment of the button 122 in FIGS. 1A-1C, or any other buttons described herein. The device 600 may correspond to or be an embodiment of the device 100. The descriptions of the button 122 and the device 100 will be understood to apply equally to the button 610 and device 600.

Figure 6B:
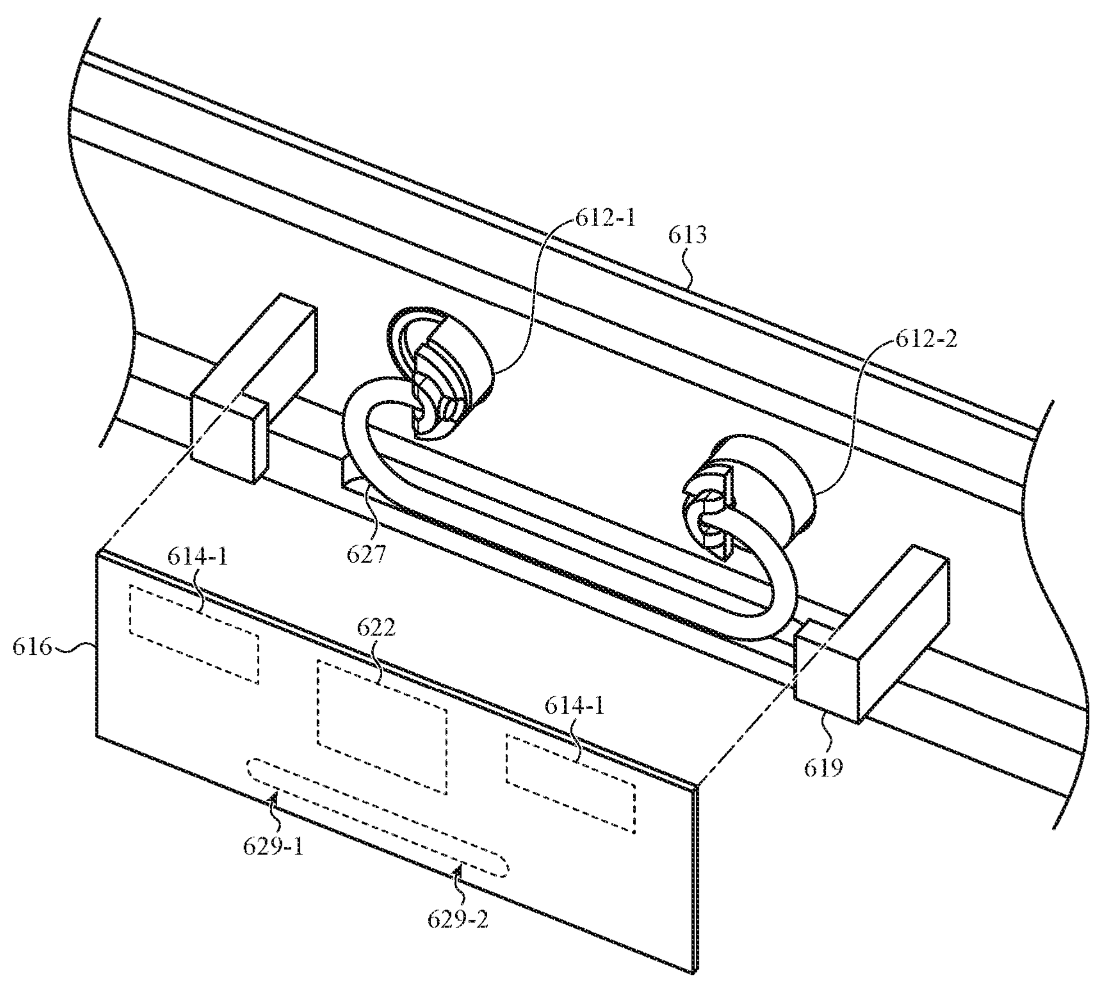
FIG. 6B depicts an exploded view of a portion of an electronic device with an input button.

The example button 610 in FIGS. 6A-6B may provide continuous force sensing, binary force sensing, and optionally input location sensing capabilities, as described herein. Input location sensing may also facilitate gesture sensing, as described herein.

The button 610 includes a beam structure 616 that is deflected in response to input forces. A switch element 622 may be positioned on and/or coupled to the beam structure. The beam structure 616 may be supported by a bracket 619 (which may be coupled to the device housing 613 or otherwise configured to support the beam structure 616). In this example, the switch element 622 is positioned on a top of the beam structure 616, such that force from an input is applied to the beam structure through the switch element 622. While the brackets 619 are shown as separate components from the beam structure 616, this is merely an example, and the brackets 619 and beam structure 616 may be formed as a unitary component (e.g., a monolithic piece of metal, which may be machined, molded, and/or otherwise formed to provide the functions of the brackets 619 and the beam structure 616).

Similar to the button 210, the beam structure 616 and the switch element 622 may be configured such that the beam structure 616 deforms or deflects a certain amount before the switch element 622 is actuated. Accordingly, the button 610 may facilitate a multi-stage button (e.g., responsive to both partial and full presses), as described herein.

The button 610 includes an input member 611. The input member 611 may define an interface or input surface that a user presses in order to actuate the button 610. In some cases, as described herein, the button 610 may be capable of determining a location of a force input applied to the input member 611. In such cases, the input member 611 may define actuation regions 606, 608 (e.g., proximate opposite ends of the input member 611). When a user presses on the first actuation region 606, the device may perform a first action (e.g., performing a zoom-in operation), and when a user presses on the second actuation region 608, the device may perform a second action (e.g., performing a zoom-out operation). Other operations may also be performed based on the location of the input, and optionally a force of the input at that location. Also, as described herein, in some cases, the location of the force does not have an effect on the device's response.

The input member 611 may include posts 612-1, 612-2 that extend through holes formed in the housing 613. The posts 612 may be coupled to a plate 625, and the plate 625 may define the unactuated position of the input member 611 (e.g., the maximum limit of outward travel of the input member 611), and ultimately retain the input member 611 to the housing 613.

The button 610 may also include a shim 626. The plate 625 (or other component) may interface with the shim 626 to transfer input forces to the switch element 622. Thus, the force that deflects the beam structure 616 may be imparted through the switch element 622. In some cases, other structures or configurations are used to couple an input force applied to the input member 611 to internal components and structures (e.g., the structures supporting strain sensing elements).

The beam structure 616 may be at least partially constrained, relative to the housing 613, such that forces imparted on the beam structure 616 (e.g., via the switch element or an anti-roll bar, as described herein) cause one or more segments of the beam structure 616 to be deflected relative to the housing 613 and/or other components of the device. While the beam structure 616 may be constrained at both ends, the beam structure may be deflected differently depending on the location of the force input on the input member 611.

Sensing elements 614-1, 614-2 may be coupled to the beam structure 616 and may detect deflection of the beam structure 616 as a result of inputs to the input member 611. The sensing elements 614 may be or may include strain sensing elements (e.g., strain gauges, piezoelectric and/or piezoresistive materials, etc.), or other components or materials that detect deflection of the beam structure 616 (optionally in conjunction with other circuitry). The sensing elements 614 may produce a signal that varies continuously with the deflection of the beam structure 616 (e.g., as opposed to a collapsible switch that produces only a binary or discontinuous signal). The sensing elements 614 may be coupled to any portion of the beam structure 616 (or other deflectable structure) that deflects in response to force inputs.

In some cases, input forces may be transferred to the beam structure 616 only through the switch element 622. In such cases, forces applied at different locations on the input member 611 may not result in unique strain or deflection profiles of the beam structure 616. In some cases, a stabilizer bar 627 may be coupled to the posts 612 and pivotally restrained to the housing 613. The stabilizer bar 627 may inhibit or resist rocking or pivoting of the input member 611 in response to force inputs by physically linking the posts 612-1, 612-2 through a partially-constrained member (e.g., the stabilizer bar 627).

In some cases, as shown in FIG. 6B, the stabilizer bar 627 is at least partially constrained by the beam structure 616 (e.g., constrained between the beam structure 616 and the housing). In some cases, the stabilizer bar 627 may transfer localized forces to the beam structure 616, such as at location 630. Thus, for example, input forces applied to one location on the input member 611 (e.g., input region 606) may result in a higher force, through the stabilizer bar 627, at one side of the beam structure 616. This may result in the beam structure 616 deflecting differently based on the location of the force input (e.g., a higher force on the left side of the input member, as oriented in FIG. 6B, will result in a higher force and deflection at the location 629-1 on the beam structure 616, while a higher force on the right side will result in a higher force and deflection at the location 629-2). As such, the strain sensing elements 614 (along with other suitable circuitry) may determine a location of an input force based on the different beam deflections.

While the button 610 is shown as having two strain sensing elements, in some implementations, more or fewer strain sensing elements may be used. In some cases, only a single strain sensing element is used (e.g., one or the other of elements 614 may be omitted). In such cases, the button 610 may detect a magnitude force applied to the button (or otherwise differentiate between forces of different magnitudes), but may not have the ability to determine, based on strain or force values, a location of a force input on a button member.

Figure 7A:
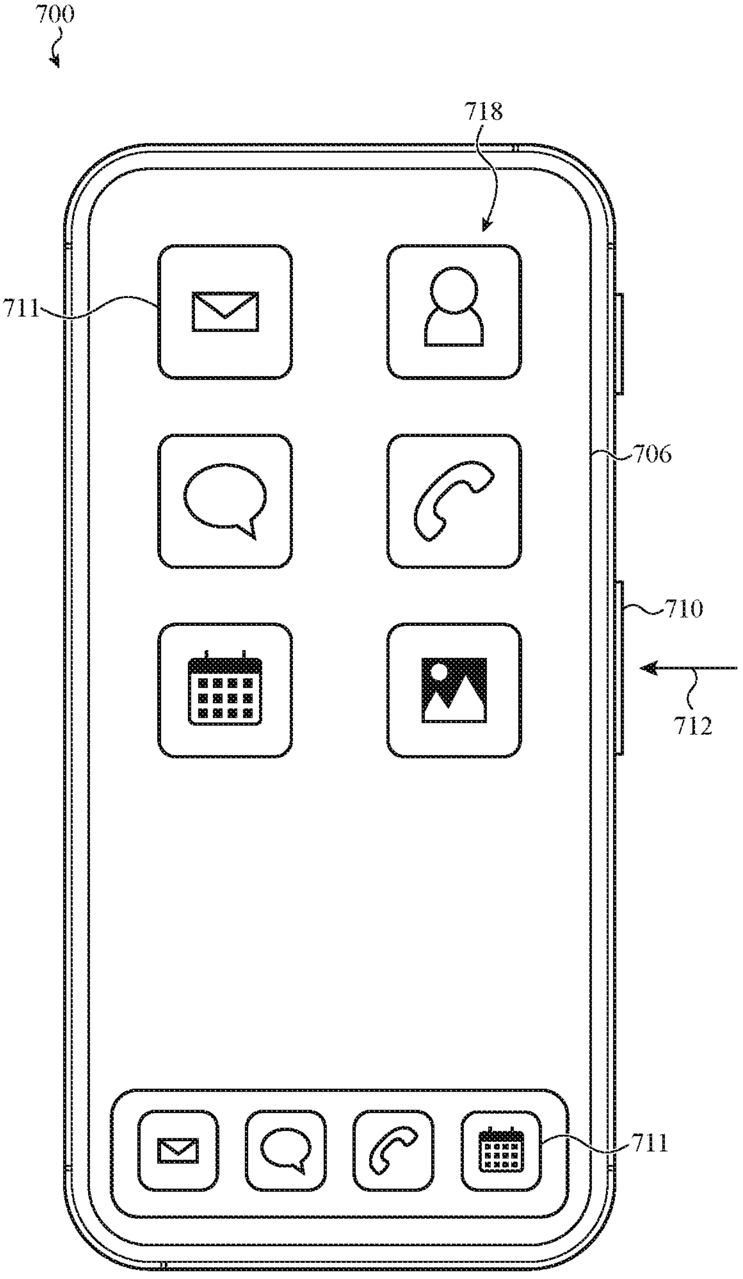
FIGS. 7A-7C depict operations of an electronic device with input button assemblies as described herein.
Figure 7B:
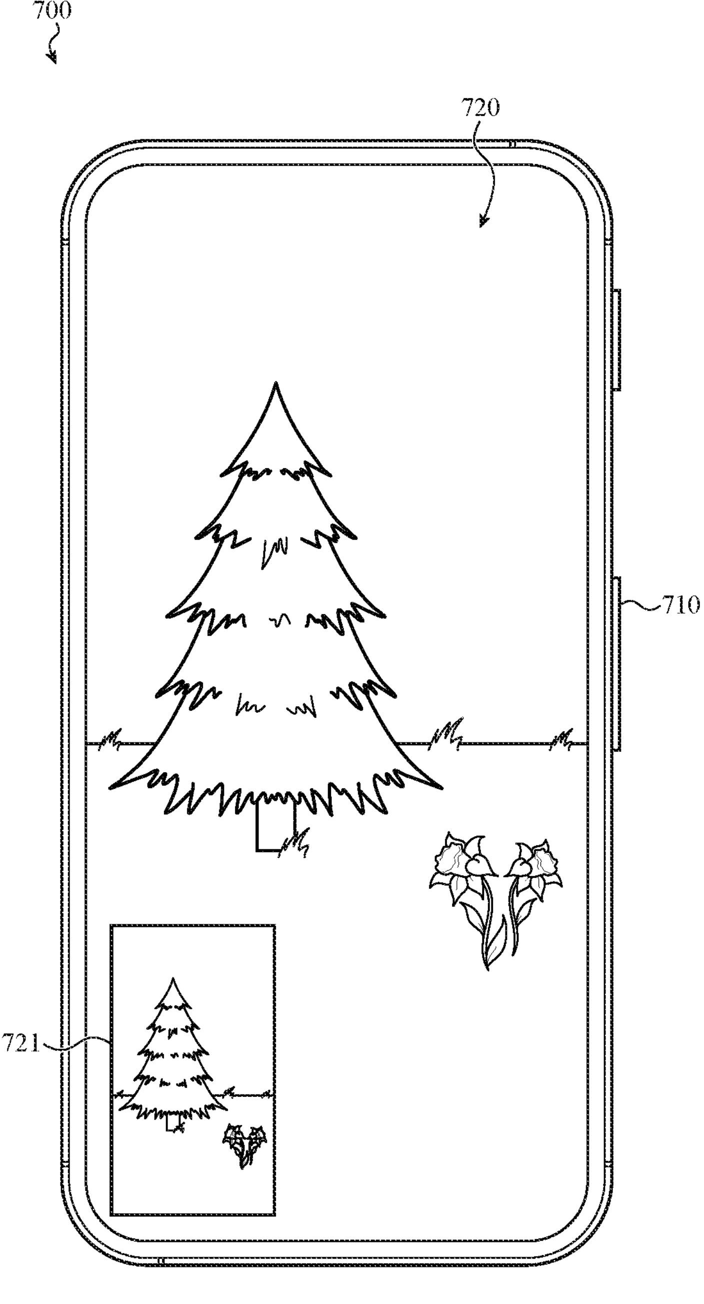
Figure 7C:
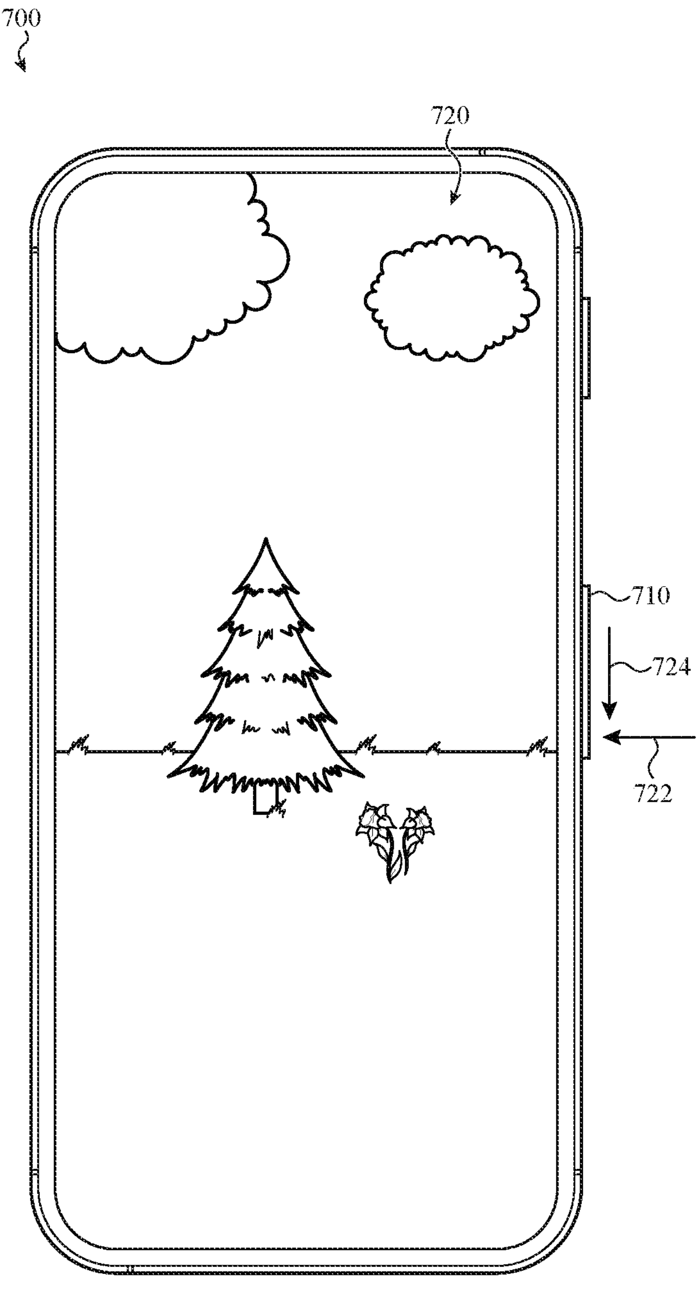

FIGS. 7A-7C illustrate an example device with a button 710, showing various ways in which inputs to the button 710 may control operations of the device. The button 710 may correspond to or be an embodiment of the button 122, or any other buttons described herein. More particularly, the button 710 may use strain sensing elements and switch elements, as described herein, to provide continuous force sensing, input location sensing, gesture sensing, and binary force sensing capabilities, as described herein.

FIG. 7A illustrates the device 700 while a first graphical output 718 is displayed on a display 706. In this example, the graphical output 718 includes a first graphical user interface. The graphical user interface may correspond to a primary graphical user interface or "home screen." As shown, the graphical user interface includes application icons 711, which are selectable (e.g., by a touch input to the display 706) to launch application graphical user interfaces. Application graphical user interfaces may provide user interface elements that facilitate an application function or other device function. Example application graphical user interfaces may include email user interfaces, messaging user interfaces, image capture user interfaces, gaming user interfaces, or the like.

As described herein, the button 710 may be used to initiate certain device functions regardless of the state of the device. For example, the button 710 may be configured to initiate image capture functions, even if the device is not currently in an image capture mode or displaying an image capture user interface.

For example, FIG. 7A illustrates a force input 712 being applied to the button 710. In this example, the force input 712 may correspond to a force input that results in the actuation of a switch element (e.g., actuation or collapse of a collapsible dome switch or other type of switch element). As described herein, this may correspond to the force input satisfying a second force threshold, and may generally correspond to a "full press" of the button 710.

Despite the device 700 not being in an image capture mode (e.g., the device is not currently displaying an image capture user interface), in response the force input 712 satisfying the force threshold (e.g., the switch being actuated), the device 700 may capture an image. In some cases, the image is captured without requiring the image capture user interface to be displayed.

In some cases, in addition to capturing an image, in response to the button 710 being pressed (e.g., a full press), the device 700 may also transition to a graphical user interface associated with an image capture function (e.g., an image capture user interface). FIG. 7B illustrates the device 700 after the button 710 has been pushed (e.g., a full press), according to some examples. In particular, the device 700 has transitioned to an image capture user interface 720 (e.g., including a live display of the field of view of a camera). In some cases, the device 700 may also display a preview 721 of the image that was captured in response to the force input 712. Thus, FIG. 7B illustrates that, in response to receiving the force input, the device 700 captured an image and transitioned to the image capture user interface. As discussed, this may occur regardless of the mode of the device, the active application on the device, or the particular graphical user interface that is being displayed by the device. Thus, the button 710 may operate as a shortcut or direct action button that can quickly initiate an action or operation without having to provide multiple inputs or interactions with the device.

As described herein, the button 710 may be configured to detect partial presses, or force inputs that satisfy a force threshold but do not cause the switch element to be actuated. These inputs may also cause the device to perform an action or operation. For example, if a force input that satisfies a lower force threshold (e.g., less than is required to actuate a switch element), the device 700 may transition to the image capture user interface without capturing an image. Thus, the "partial press" of the button 710 may act as a shortcut or direct action button to launch the image capture user interface (e.g., regardless of the mode or active user interface of the device).

FIG. 7C illustrates additional types of inputs that may be applied to the button 710. For example, as described herein, the button 710 may be configured to determine a location of a force input applied to the input member. Such functionality may allow the device to take different actions based on the location of the force input, and may also facilitate gesture detection.

FIG. 7C illustrates the device 700 displaying an image capture user interface. As one example input, a force input 722 may be applied to the button 710 towards an end of the button (e.g., offset from the center). The device 700 may determine the region where the force input was applied, and perform an operation based on the region. In this example, the region where the force input was applied may correspond to a zoom-out operation. FIG. 7C illustrates the image capture preview having been zoomed out in response to the input. On the other hand, if the force input had been applied to a different region (e.g., the opposite end of the input member, towards a top of the device 700), the device may have performed a different operation (e.g., zoomed in). In some cases, as described above, the magnitude of the force applied to the button may be used to scale or control the device's response. For example, a greater force may result in a faster zoom operation, allowing the user to easily and intuitively produce a desired response simply by modulating the force applied to the button.

FIG. 7C also illustrates how a gesture input may be used to control or initiate a device operation. In particular, a user may swipe along the input member of the button 710 (indicated by arrow 724). The swipe may include at least a nominal force on the input member 710 that can be detected by the strain sensing elements, and the device 700 can determine parameters of the gesture input based on signals from the strain sensing elements (e.g., direction, speed, distance, magnitude, etc.). In response to detecting the gesture input, and based at least in part on a parameter of the input (e.g., a direction), the device 700 may perform an operation. For example, the gesture may cause the device to perform a zoom out operation, as illustrated in FIG. 7C. The device may perform a different operation (e.g., a zoom in operation) if the direction of the gestures input were reversed.

While the foregoing examples describe performing image capture operations in response to button inputs, this is merely for illustration. As described herein, other actions may be initiated in response to button inputs, and the particular actions may be selectable by a user of the device.

Figure 8:
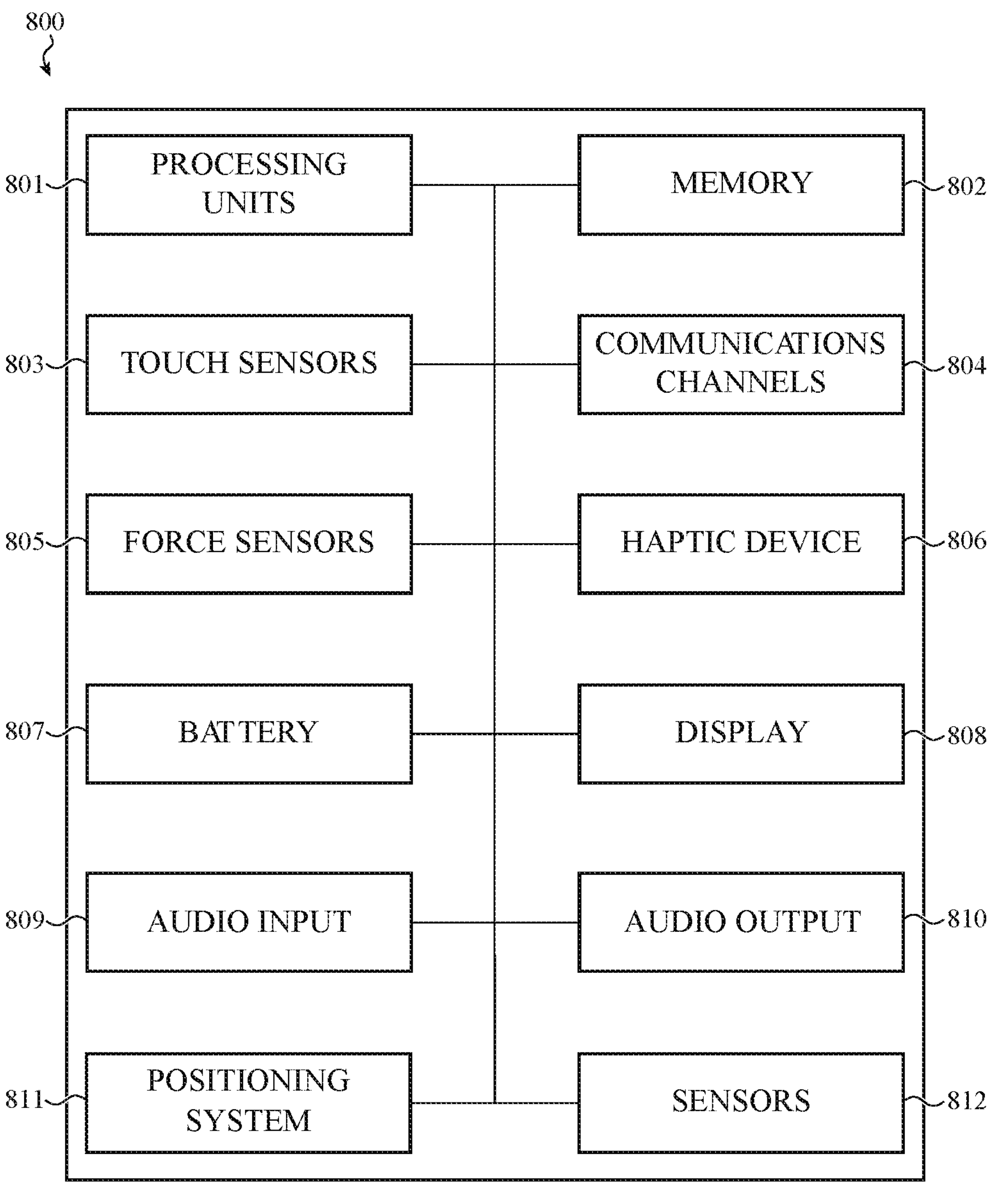
FIG. 8 depicts a schematic diagram of an example electronic device.

FIG. 8 depicts an example schematic diagram of an electronic device 800. The electronic device 800 may be an embodiment of or otherwise represent the device 100 (or other devices described herein). The device 800 includes one or more processing units 801 that are configured to access a memory 802 having instructions stored thereon. The processing units 801 may be or may be part of processing systems that provide the functionality described herein. The instructions or computer programs may be configured to perform one or more of the operations or functions described with respect to the electronic devices described herein. For example, the instructions may be configured to control or coordinate the operation of one or more displays 808, one or more touch sensors 803, one or more force sensors 805, one or more communication channels 804, one or more audio input systems 809, one or more audio output systems 810, one or more positioning systems 811, one or more sensors 812, and/or one or more haptic feedback devices 806.

The processing units 801 of FIG. 8 may be implemented as any electronic device capable of processing, receiving, or transmitting data or instructions. For example, the processing units 801 may include one or more of: a microprocessor, a central processing unit (CPU), an application-specific integrated circuit (ASIC), a digital signal processor (DSP), or combinations of such devices. As described herein, the terms "processor" and "processing system" are meant to encompass a single processor or processing unit, multiple processors, multiple processing units, or other suitably configured computing element or elements. The processing units 801 may be coupled to a circuit board assembly.

The memory 802 can store electronic data that can be used by the device 800. For example, a memory can store electrical data or content such as, for example, audio and video files, images, documents and applications, device settings and user preferences, programs, instructions, timing and control signals or data for the various modules, data structures or databases, and so on. The memory 802 can be configured as any type of memory. By way of example only, the memory can be implemented as random access memory, read-only memory, Flash memory, removable memory, or other types of storage elements, or combinations of such devices.

The touch sensors 803 may detect various types of touch-based inputs and generate signals or data that are able to be accessed using processor instructions. The touch sensors 803 may use any suitable components and may rely on any suitable phenomena to detect physical inputs. For example, the touch sensors 803 may be capacitive touch sensors, resistive touch sensors, acoustic wave sensors, or the like. The touch sensors 803 may include any suitable components for detecting touch-based inputs and generating signals or data that are able to be accessed using processor instructions, including electrodes (e.g., electrode layers), physical components (e.g., substrates, spacing layers, structural supports, compressible elements, etc.), processors, circuitry, firmware, and the like. The touch sensors 803 may be integrated with or otherwise configured to detect touch inputs applied to any portion of the device 800. For example, the touch sensors 803 may be configured to detect touch inputs applied to any portion of the device 800 that includes a display (and may be integrated with a display). The touch sensors 803 may operate in conjunction with the force sensors 805 to generate signals or data in response to touch inputs. A touch sensor or force sensor that is positioned over a display surface or otherwise integrated with a display may be referred to herein as a touch-sensitive display, force-sensitive display, or touchscreen.

The force sensors 805 may detect various types of force-based inputs and generate signals or data that are able to be accessed using processor instructions. The force sensors 805 may use any suitable components and may rely on any suitable phenomena to detect physical inputs. For example, the force sensors 805 may be strain-based sensors, piezoelectric-based sensors, piezoresistive-based sensors, capacitive sensors, resistive sensors, or the like. The force sensors 805 may include any suitable components for detecting force-based inputs and generating signals or data that are able to be accessed using processor instructions, including electrodes (e.g., electrode layers), physical components (e.g., substrates, spacing layers, structural supports, compressible elements, etc.), processors, circuitry, firmware, and the like. The force sensors 805 may be used in conjunction with various input mechanisms to detect various types of inputs. For example, the force sensors 805 may be used to detect presses or other force inputs that satisfy a force threshold (which may represent a more forceful input than is typical for a standard "touch" input). Like the touch sensors 803, the force sensors 805 may be integrated with or otherwise configured to detect force inputs applied to any portion of the device 800. For example, the force sensors 805 may be configured to detect force inputs applied to any portion of the device 800 that includes a display (and may be integrated with a display). The force sensors 805 may operate in conjunction with the touch sensors 803 to generate signals or data in response to touch- and/or force-based inputs. Force sensors may also be integrated into button assemblies to detect force inputs applied to input members, as described herein. For example, the buttons described herein may include or utilize force sensors 805 (e.g., strain-based force sensors) to determine whether a force input to the button satisfies a threshold, and/or to more generally determine properties of force inputs (e.g., force magnitude, application location on an input member, etc.).

The device 800 may also include one or more haptic devices 806 (e.g., the haptic actuation systems of the buttons described herein). The haptic device 806 may include one or more of a variety of haptic technologies such as, but not necessarily limited to, rotational haptic devices, linear actuators, piezoelectric devices, vibration elements, and so on. In general, the haptic device 806 may be configured to provide punctuated and distinct feedback to a user of the device. More particularly, the haptic device 806 may be adapted to produce a knock or tap sensation and/or a vibration sensation. Such haptic outputs may be provided in response to detection of touch and/or force inputs, and may be imparted to a user through the exterior surface of the device 800 and/or input members of buttons, as described herein. For example, the buttons described herein may include or utilize haptic devices 806, and haptic outputs may be imparted to a user through the input members of the buttons (e.g., in response to detecting an input force that satisfies a force threshold but is not great enough to actuate a switch element).

The one or more communication channels 804 may include one or more wireless interface(s) that are adapted to provide communication between the processing unit(s) 801 and an external device. The one or more communication channels 804 may include antennas (e.g., antennas that include or use housing components as radiating members), communications circuitry, firmware, software, or any other components or systems that facilitate wireless communications with other devices. In general, the one or more communication channels 804 may be configured to transmit and receive data and/or signals that may be interpreted by instructions executed on the processing units 801. In some cases, the external device is part of an external communication network that is configured to exchange data with wireless devices. Generally, the wireless interface may communicate via, without limitation, radio frequency, optical, acoustic, and/or magnetic signals and may be configured to operate over a wireless interface or protocol. Example wireless interfaces include radio frequency cellular interfaces (e.g., 2G, 3G, 4G, 4G long-term evolution (LTE), 5G, GSM, CDMA, or the like), fiber optic interfaces, acoustic interfaces, Bluetooth interfaces, infrared interfaces, USB interfaces, Wi-Fi interfaces (e.g., for communicating using Wi-Fi communication standards and/or protocols, including IEEE 802.11, 802.11b, 802.11a, 802.11g, 802.11n, 802.11ac, 802.11ax (Wi-Fi 6, 6E), 802.11be (Wi-Fi 7), or any other suitable Wi-Fi standards and/or protocols), TCP/IP interfaces, network communications interfaces, or any conventional communication interfaces. The one or more communications channels 804 may also include ultra-wideband (UWB) interfaces, which may include any appropriate communications circuitry, instructions, and number and position of suitable UWB antennas.

As shown in FIG. 8, the device 800 may include a battery 807 that is used to store and provide power to the other components of the device 800. The battery 807 may be a rechargeable power supply that is configured to provide power to the device 800. The battery 807 may be coupled to charging systems (e.g., wired and/or wireless charging systems) and/or other circuitry to control the electrical power provided to the battery 807 and to control the electrical power provided from the battery 807 to the device 800.

The device 800 may also include one or more displays 808 configured to display graphical outputs. The displays 808 may use any suitable display technology, including liquid crystal displays (LCD), organic light-emitting diodes (OLED), active-matrix organic light-emitting-diode displays (AMOLED), or the like. The displays may use a low temperature polycrystalline silicone (LTPS) or low temperature polycrystalline oxide (LTPO) backplane. The displays 808 may display graphical user interfaces, images, icons, or any other suitable graphical outputs. The display 808 may correspond to the display 103 or other displays described herein.

The device 800 may also provide audio input functionality via one or more audio input systems 809. The audio input systems 809 may include microphones, transducers, or other devices that capture sound for voice calls, video calls, audio recordings, video recordings, voice commands, and the like.

The device 800 may also provide audio output functionality via one or more audio output systems (e.g., speakers) 810. The audio output systems 810 may produce sound from voice calls, video calls, streaming or local audio content, streaming or local video content, or the like. The audio output systems 810 may also produce audible alerts, ringtones, or the like.

The device 800 may also include a positioning system 811. The positioning system 811 may be configured to determine the location of the device 800. For example, the positioning system 811 may include magnetometers, gyroscopes, accelerometers, optical sensors, cameras, global positioning system (GPS) receivers, inertial positioning systems, or the like. The positioning system 811 may be used to determine spatial parameters of the device 800, such as the location of the device 800 (e.g., geographical coordinates of the device), measurements or estimates of physical movement of the device 800, an orientation of the device 800, or the like.

The device 800 may also include one or more additional sensors 812 (also referred to as sensing systems) to receive inputs (e.g., from a user or another computer, device, system, network, etc.) or to detect any suitable property or parameter of the device, the environment surrounding the device, people, or things interacting with the device (or nearby the device), or the like. For example, a device may include temperature sensors, biometric sensors (e.g., fingerprint sensors, facial recognition systems, photoplethysmographs, blood-oxygen sensors, blood sugar sensors, or the like), eye-tracking sensors, proximity sensors, depth sensors (e.g., time-of-flight based depth or distance sensors), ambient light sensors, retinal scanners, humidity sensors, buttons, switches, lid-closure sensors, or the like.

To the extent that multiple functionalities, operations, and structures described with reference to FIG. 8 are disclosed as being part of, incorporated into, or performed by the device 800, it should be understood that various embodiments may omit any or all such described functionalities, operations, and structures. Thus, different embodiments of the device 800 may have some, none, or all of the various capabilities, apparatuses, physical features, modes, and operating parameters discussed herein. Further, the systems included in the device 800 are not exclusive, and the device 800 may include alternative or additional systems, components, modules, programs, instructions, or the like, that may be necessary or useful to perform the functions described herein.

As described above, one aspect of the present technology is the gathering and use of data available from various sources to improve the usefulness and functionality of devices such as tablet computers and mobile phones. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to locate devices, deliver targeted content that is of greater interest to the user, or the like. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above, below, over, under, left, or right (or other similar relative position terms), do not necessarily refer to an absolute position relative to an external reference, but instead refer to the relative position of components within the figure being referred to. Similarly, horizontal and vertical orientations may be understood as relative to the orientation of the components within the figure being referred to, unless an absolute horizontal or vertical orientation is indicated.

Features, structures, configurations, components, techniques, etc. shown or described with respect to any given figure (or otherwise described in the application) may be used with features, structures, configurations, components, techniques, etc. described with respect to other figures. For example, any given figure of the instant application should not be understood to be limited to only those features, structures, configurations, components, techniques, etc. shown in that particular figure. Similarly, features, structures, configurations, components, techniques, etc. shown only in different figures may be used or implemented together. Further, features, structures, configurations, components, techniques, etc. that are shown or described together may be implemented separately and/or combined with other features, structures, configurations, components, techniques, etc. from other figures or portions of the instant specification. Further, for ease of illustration and explanation, figures of the instant application may depict certain components and/or sub-assemblies in isolation from other components and/or sub-assemblies of an electronic device, though it will be understood that components and sub-assemblies that are illustrated in isolation may in some cases be considered different portions of a single electronic device (e.g., a single embodiment that includes multiple of the illustrated components and/or sub-assemblies).

What is claimed is:

1. An electronic device comprising:

an enclosure comprising:

a front cover defining a front exterior surface of the electronic device; and a housing component coupled to the front cover and defining a side exterior surface of the electronic device;

an input button system comprising:

an input member positioned along the side exterior surface of the housing component and configured to receive a force input;

a beam structure at least partially within the enclosure, the beam structure configured to be deflected as a result of the force input on the input member;

a first strain sensing element at a first location of the beam structure; and a second strain sensing element at a second location of the beam structure;

a processing system coupled to the first strain sensing element and the second strain sensing element and configured to:

determine a location of the force input on the input member based at least in part on at least one of a first signal from the first strain sensing element or a second signal from the second strain sensing element; and cause the electronic device to perform a first operation in response to detecting, based at least in part on at least one of the first signal from the first strain sensing element or the second signal from the second strain sensing element, that the force input satisfies a first force threshold; and a dome switch configured to collapse in response to the force input satisfying a second force threshold greater than the first force threshold, the electronic device configured to perform a second operation in response to detecting the collapse of the dome switch.

2. The electronic device of claim 1, wherein:

the electronic device further comprises a haptic actuation system;

the processing system is configured to cause the haptic actuation system to produce a first tactile output in response to detecting that the force input satisfies the first force threshold; and the dome switch produces a second tactile output when collapsed in response to the force input satisfying the second force threshold.

3. The electronic device of claim 1, wherein:

the dome switch is positioned below the beam structure; and the dome switch is partially deformed by the beam structure in response to the force input.

4. The electronic device of claim 1, wherein:

the electronic device further includes:

a camera; and a display configured to display graphical user interfaces; and the first operation includes causing the display to transition to a graphical user interface associated with an image capture function; and the second operation includes capturing an image when the display is not displaying the graphical user interface associated with the image capture function.

5. The electronic device of claim 4, wherein the processing system is configured to:

in accordance with a determination that the force input was applied to a first region of the input member, cause the electronic device to perform a third operation; and in accordance with a determination that the force input was applied to a second region of the input member, cause the electronic device to perform a fourth operation.

6. The electronic device of claim 5, wherein:

the third operation includes a zoom-in operation; and the fourth operation includes a zoom-out operation.

7. The electronic device of claim 1, wherein:

the first force threshold is between about 0.8 Newtons and about 1.2 Newtons; and the second force threshold is between about 3.0 Newtons and about 4.0 Newtons.

8. The electronic device of claim 1, wherein:

the dome switch is coupled to the beam structure; and force from the force input is transferred to the beam structure via the dome switch.

9. A portable electronic device comprising:

a touchscreen display;

a battery; and an enclosure enclosing the touchscreen display and the battery, the enclosure comprising:

a front cover positioned over the touchscreen display and defining a front exterior surface of the enclosure; and a housing component coupled to the front cover and defining an opening along a side exterior surface of the enclosure; and an input button system comprising:

a beam structure at least partially within the enclosure and comprising:

a first compliant segment positioned proximate a first end of the beam structure; and a second compliant segment positioned proximate a second end of the beam structure;

a first strain sensing element coupled to the first compliant segment;

a second strain sensing element coupled to the second compliant segment;

a switch element positioned proximate a central region of the beam structure, the central region of the beam structure between the first end and the second end of the beam structure; and an input member positioned at least partially in the opening and configured to impart a force on the beam structure and on the switch element as a result of a force input applied to the input member; and a processing system configured to, in accordance with a determination that the force input satisfies a force threshold, cause the portable electronic device to perform an operation, the determination based at least in part on at least one of a first signal from the first strain sensing element or a second signal from the second strain sensing element, wherein the force threshold is less than an actuation force of the switch element.

10. The portable electronic device of claim 9, wherein the processing system is configured to determine a region on the input member where the force input was applied based at least in part on at least one of the first signal from the first strain sensing element or the second signal from the second strain sensing element.

11. The portable electronic device of claim 9, wherein:

the portable electronic device further comprises a haptic actuation system;

the processing system is configured to cause the haptic actuation system to produce a first tactile output in response to detecting that the force input satisfies the force threshold; and the switch element produces a second tactile output when the switch element is actuated.

12. The portable electronic device of claim 9, wherein:

the operation includes causing the touchscreen display to transition to a graphical user interface associated with an image capture function; and the portable electronic device is further configured to capture an image in response to the switch element being actuated when the touchscreen display is not displaying the graphical user interface associated with the image capture function.

13. The portable electronic device of claim 12, wherein the processing system is further configured to determine a swipe direction of a swipe input applied to the input member based at least in part on a third signal from the first strain sensing element and a fourth signal from the second strain sensing element, the swipe input including a swipe gesture extending along a surface of the input member.

14. The portable electronic device of claim 13, wherein the portable electronic device is configured to:

perform a zoom-in operation in response to determining that the swipe direction is a first direction; and perform a zoom-out operation in response to determining that the swipe direction is a second direction opposite the first direction.

15. The portable electronic device of claim 9, wherein a difference between the force threshold and the actuation force is between about 0.5 Newtons and about 1.5 Newtons.

16. An electronic device comprising:

a housing component defining a side exterior surface;

a front cover coupled to the housing component;

a display positioned below the front cover;

a haptic actuation system;

an input member positioned along the side exterior surface of the housing component and configured to receive a force input;

a beam structure at least partially within the electronic device, the beam structure configured to be deflected as a result of the force input on the input member;

a first strain sensing element at a first location of the beam structure;

a second strain sensing element at a second location of the beam structure;

a processing system coupled to the first strain sensing element and the second strain sensing element and configured to:

based at least in part on at least one of a first signal from the first strain sensing element or a second signal from the second strain sensing element, determine that the force input satisfies a first force threshold; and in response to determining that the force input satisfies the first force threshold, cause the haptic actuation system to produce a first tactile output; and a dome switch configured to collapse in response to the force input satisfying a second force threshold, thereby producing a second tactile output, the second force threshold greater than the first force threshold.

17. The electronic device of claim 16, wherein:

the input member defines:

a first input region at a first end of the input member; and a second input region at a second end of the input member opposite the first end; and the processing system is further configured to determine whether the force input was applied to the first input region of the input member or the second input region of the input member based at least in part on the first signal from the first strain sensing element or the second signal from the second strain sensing element.

18. The electronic device of claim 17, wherein:

the electronic device further includes a camera; and the processing system is further configured to:

in response to determining that the force input satisfies the first force threshold and was applied to the first input region of the input member, perform a zoom-in operation;

in response to determining that the force input satisfies the first force threshold and was applied to the second input region of the input member, perform a zoom-out operation; and in response to the dome switch collapsing, capture an image with the camera.

19. The electronic device of claim 16, wherein the haptic actuation system is configured to produce a third tactile output in response to a touch input applied to the front cover.

20. The electronic device of claim 16, wherein the dome switch is positioned on the beam structure and the force input is imparted to the beam structure via the dome switch.

* * * * *